United States Patent
Fujiwara

(10) Patent No.: US 12,528,979 B2
(45) Date of Patent: Jan. 20, 2026

(54) ADHESIVE MEMBER, METHOD OF MANUFACTURING DISPLAY DEVICE INCLUDING FORMING THE ADHESIVE MEMBER, AND DISPLAY DEVICE MANUFACTURED THEREBY

(71) Applicant: Samsung Display Co., Ltd., Yongin-si (KR)

(72) Inventor: Tetsuya Fujiwara, Yokohama (JP)

(73) Assignee: Samsung Display Co., Ltd., Yongin-si (KR)

( * ) Notice: Subject to any disclaimer, the term of this patent is extended or adjusted under 35 U.S.C. 154(b) by 138 days.

(21) Appl. No.: 18/471,044

(22) Filed: Sep. 20, 2023

(65) Prior Publication Data

US 2024/0209246 A1    Jun. 27, 2024

(30) Foreign Application Priority Data

Dec. 21, 2022 (KR) .......... 10-2022-0180967

(51) Int. Cl.
*C09J 133/10* (2006.01)

(52) U.S. Cl.
CPC ....... *C09J 133/10* (2013.01); *C09J 2301/312* (2020.08); *C09J 2301/408* (2020.08); *C09J 2301/416* (2020.08); *C09J 2301/502* (2020.08); *C09J 2400/143* (2013.01)

(58) Field of Classification Search
CPC .............. C09J 133/10; C09J 2301/416; C09J 2301/502
See application file for complete search history.

(56) References Cited

U.S. PATENT DOCUMENTS

| 11,414,558 B2 | 8/2022 | Nakashima et al. |
| 2012/0276354 A1* | 11/2012 | Thompson .............. B32B 7/022 156/307.3 |
| 2018/0362279 A1 | 12/2018 | Yoshida et al. |
| 2021/0292536 A1 | 9/2021 | Fujiwara et al. |

(Continued)

FOREIGN PATENT DOCUMENTS

| JP | 2012-237965 A | 12/2012 |
| JP | 5910988 B2 | 4/2016 |

(Continued)

*Primary Examiner* — Daniel McNally
(74) *Attorney, Agent, or Firm* — Womble Bond Dickinson (US) LLP

(57) ABSTRACT

An adhesive member of may include a polymer derived from a resin composition including at least one urethane (meth)acrylate oligomer including two (meth)acryloyl groups per oligomer unit, at least one polyfunctional (meth) acrylate monomer including multiple (meth)acryloyl groups per monomer unit, and at least one photoinitiator. The weight of the urethane (meth)acrylate oligomer may be 1 wt % or more and less than 10 wt %, and the weight of the polyfunctional (meth)acrylate monomer may be 0.2 wt % or more and less than 2 wt %, based on a total weight of the resin composition. The glass transition temperature of the adhesive member may be −10° C. or more and less than 10° C., and the loss tangent (tan δ) of the adhesive member at −40° C. may be 0.01 or more and less than 0.3. Accordingly, the adhesive member may undergo easy rework at −40° C. and show excellent or suitable adhesion reliability during use.

14 Claims, 10 Drawing Sheets

(56) References Cited

U.S. PATENT DOCUMENTS

| 2021/0355354 | A1 | 11/2021 | Yamamoto |
| 2022/0135785 | A1 | 5/2022 | Yamamoto |
| 2022/0144992 | A1 | 5/2022 | Yamamoto |
| 2022/0177626 | A1 | 6/2022 | Fujiwara |
| 2022/0242984 | A1 | 8/2022 | Kim et al. |

FOREIGN PATENT DOCUMENTS

| JP | 6062759 | B2 | 1/2017 |
| JP | 2017-210578 | A | 11/2017 |
| JP | 2019-061323 | A | 4/2019 |
| JP | 6572417 | B2 | 9/2019 |
| JP | 2019-172869 | A | 10/2019 |
| JP | 2019-183018 | A | 10/2019 |
| JP | 2020-084123 | A | 6/2020 |
| JP | 6947665 | B2 | 10/2021 |
| JP | 2022-007466 | A | 1/2022 |
| JP | 6996250 | B2 | 1/2022 |
| KR | 10-2018-0100244 | A | 9/2018 |
| KR | 10-2020-0064061 | A | 6/2020 |
| KR | 10-2021-0034717 | A | 3/2021 |
| KR | 10-2021-0076600 | A | 6/2021 |
| KR | 10-2021-0118333 | A | 9/2021 |
| KR | 10-2021-0142806 | A | 11/2021 |
| KR | 10-2022-0058699 | A | 5/2022 |
| KR | 10-2022-0063812 | A | 5/2022 |
| KR | 10-2022-0082131 | A | 6/2022 |
| KR | 10-2022-0108288 | A | 8/2022 |
| WO | WO 2019-069872 | A1 | 4/2019 |

\* cited by examiner

ADHESIVE MEMBER, METHOD OF MANUFACTURING DISPLAY DEVICE INCLUDING FORMING THE ADHESIVE MEMBER, AND DISPLAY DEVICE MANUFACTURED THEREBY

CROSS-REFERENCE TO RELATED APPLICATION(S)

This U.S. application claims priority to and the benefit of Korean Patent Application No. 10-2022-0180967, filed on Dec. 21, 2022, the entire content of which is hereby incorporated by reference.

BACKGROUND

1. Field

Embodiments of the present disclosure relate to an adhesive member, a method of manufacturing a display device including forming the adhesive member, and a display device manufactured thereby.

2. Description of the Related Art

Various display devices utilized in multimedia devices, such as televisions, cellular phones, tablet computers, navigations and game consoles, are being developed. An adhesive resin used for forming an adhesive member applied in various shapes of display devices is desired and/or required to have excellent or suitable coatability with respect to a member for the various shapes of display devices.

When bubbles and/or foreign materials are incorporated during attaching an adhesive resin to a member of a display device, or when an attaching position is deviated, the adhesive resin and the member of a display device are discarded, and a method for solving this problem is desired and/or required.

SUMMARY

Aspects of one or more embodiments of the present disclosure are directed toward an adhesive member easily or capable of being reworked at a low temperature, and a method of manufacturing a display device including forming the adhesive member.

Aspects of one or more embodiments of the present disclosure are directed toward an adhesive member having excellent or suitable adhesiveness at room temperature, and a display device including the same.

Additional aspects will be set forth in part in the description which follows and, in part, will be apparent from the description, or may be learned by practice of the presented embodiments of the disclosure.

One or more embodiments of the present disclosure provides an adhesive member including a polymer derived from a resin composition including at least one urethane (meth)acrylate oligomer including two (meth)acryloyl groups per oligomer unit, at least one polyfunctional (meth)acrylate monomer including multiple (meth)acryloyl groups per monomer unit, and at least one photoinitiator, wherein a weight of the urethane (meth)acrylate oligomer is about 1 wt % or more and (to) less than about 10 wt %, and a weight of the polyfunctional (meth)acrylate monomer is about 0.2 wt % or more and (to) less than about 2 wt %, based on a total weight of the resin composition, and a glass transition temperature of the adhesive member is about −10° C. or more and (to) less than about 10° C., and a loss tangent (tan δ) of the adhesive member at a temperature of about −40° C. is about 0.01 or more and (to) less than about 0.3.

In one or more embodiments, the adhesive member may have a 180° peel strength with respect to a glass substrate and/or a polymer substrate of about 2000 gf/25 mm or more.

In one or more embodiments, the resin composition may have a viscosity measured based on JISK 2283 at a temperature of about 30° C. of about 5 mPa·s or more and (to) less than about 20 mPa·s.

In one or more embodiments, the urethane (meth)acrylate oligomer may have a weight-average molecular weight of about 10,000 or more and (to) less than about 40,000.

In one or more embodiments, the polyfunctional (meth)acrylate monomer may have a weight-average molecular weight of about 100 or more and (to) less than about 400.

In one or more embodiments, the polyfunctional (meth)acrylate monomer may include 2 to 4 (meth)acryloyl groups per monomer unit.

In one or more embodiments, the resin composition may further include at least one monofunctional (meth)acrylate monomer.

In one or more embodiments, a weight of the monofunctional (meth)acrylate monomer may be about 85 wt % or more and (to) about 97 wt % or less, based on a total weight of the resin composition.

In one or more embodiments, the photoinitiator may include a radical polymerization initiator.

Another embodiment of the present disclosure includes a method of manufacturing a display device, including: applying a resin composition to (on) a substrate; applying a first light to the resin composition to form a preliminary adhesive member; applying a glass substrate to (on) the preliminary adhesive member; applying a second light to the preliminary adhesive member to form an adhesive member; and detaching the glass substrate at a temperature of about −40° C., wherein the resin composition includes: at least one urethane (meth)acrylate oligomer including two (meth)acryloyl groups per oligomer unit; at least one polyfunctional (meth)acrylate monomer including multiple (meth)acryloyl groups per monomer unit; and at least one photoinitiator.

In one or more embodiments, the method of manufacturing a display device may further include, after detaching the glass substrate, applying the detached glass substrate to (on) the adhesive member.

In one or more embodiments, the resin composition may have a viscosity measured based on JISK 2283 at a temperature of about 30° C. of about 5 mPa·s or more and (to) less than about 20 mPa·s.

In one or more embodiments, the urethane (meth)acrylate oligomer may have a weight-average molecular weight of about 10,000 or more and (to) less than about 40,000.

In one or more embodiments, the polyfunctional (meth)acrylate monomer may have a weight-average molecular weight of about 100 or more and (to) less than about 400.

In one or more embodiments, the polyfunctional (meth)acrylate monomer may include 2 to 4 (meth)acryloyl groups per monomer unit.

In one or more embodiments, the resin composition may be applied by an inkjet printing method or a dispensing method.

In one or more embodiments, the method of manufacturing a display device may not include (e.g., may exclude any active) drying the resin composition prior to applying the first light.

In one or more embodiments, the resin composition may further include at least one monofunctional (meth)acrylate monomer.

In one or more embodiments, a weight of the monofunctional (meth)acrylate monomer may be about 85 wt % or more and (to) about 97 wt % or less, based on a total weight of the resin composition.

In one or more embodiments, the resin composition may further include less than about 1 wt % of an organic solvent based on a total weight of the resin composition.

In one or more embodiments, a glass transition temperature of the adhesive member may be about −10° C. or more and (to) less than about 10° C., and a loss tangent (tan δ) of the adhesive member at a temperature of about −40° C. may be about 0.01 or more and (to) less than about 0.3.

In one or more embodiments, a total dosage of the second light may be greater than a total dosage of the first light.

In one or more embodiments, the second light may pass through the glass substrate and may be provided to the preliminary adhesive member.

One or more embodiments of the present disclosure provides a display device including: a display panel; a window on the display panel; an adhesive member between the display panel and the window, and including a polymer derived from a resin composition, the resin composition including at least one urethane (meth)acrylate oligomer including two (meth)acryloyl groups per oligomer unit, at least one polyfunctional (meth)acrylate monomer including multiple (meth)acryloyl groups per monomer unit, and at least one photoinitiator, wherein a weight of the urethane (meth)acrylate oligomer is about 1 wt % or more and (to) less than about 10 wt %, and a weight of the polyfunctional (meth)acrylate monomer is about 0.2 wt % or more and (to) less than about 2 wt %, based on a total weight of the resin composition, a glass transition temperature of the adhesive member is about −10° C. or more and (to) less than about 10° C., and a loss tangent (tan δ) of the adhesive member at a temperature of about −40° C. is about 0.01 or more and (to) less than about 0.3.

In one or more embodiments, the adhesive member may have a 180° peel strength with respect to a glass substrate and a polymer substrate of about 2000 gf/25 mm or more.

In one or more embodiments, the window may include a glass substrate.

In one or more embodiments, the display device may further include a light controlling layer between the adhesive member and the window, and an optical adhesive layer between the light controlling layer and the window, and the optical adhesive member may include the polymer derived from the resin composition.

In one or more embodiments, the resin composition may further include at least one monofunctional (meth)acrylate monomer.

BRIEF DESCRIPTION OF THE DRAWINGS

The accompanying drawings are included to provide a further understanding of the present disclosure and are incorporated in and constitute a part of this specification. The drawings illustrate embodiments of the present disclosure and, together with the description, serve to explain aspects, features and/or principles of the present disclosure. In the drawings.

DETAILED DESCRIPTION

Figure 1:
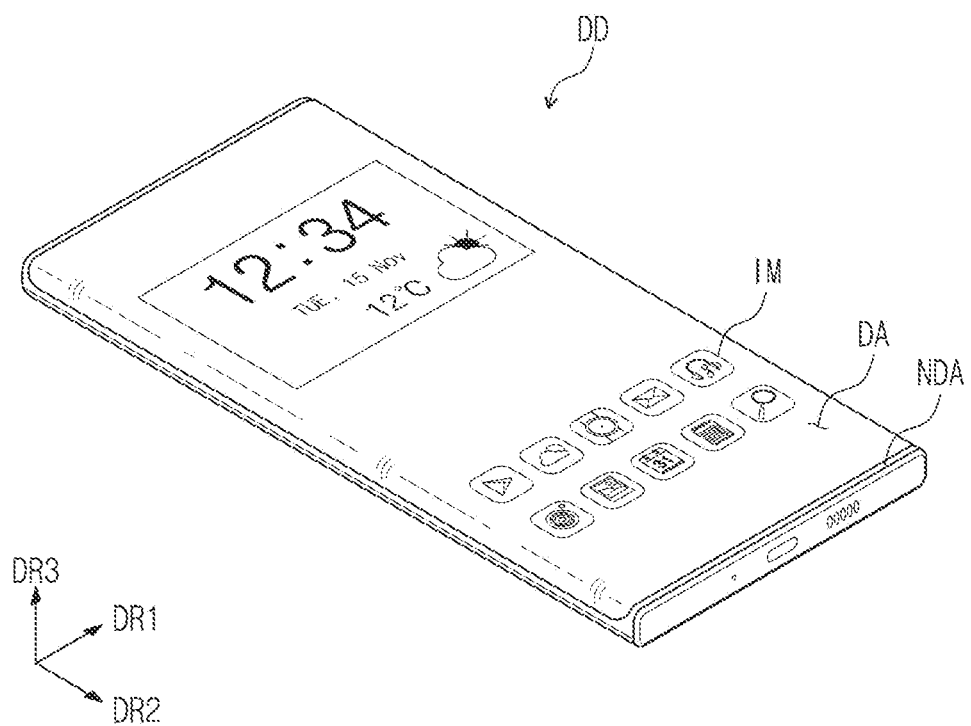
FIG. 1 is a perspective view showing a display device according to one or more embodiments of the present disclosure.

The present disclosure may be modified in many alternate forms, and thus specific embodiments will be illustrated in the drawings and described in more detail. It should be understood, however, that this is not intended to limit the present disclosure to the particular forms disclosed, but rather, is intended to cover all modifications, equivalents, and alternatives falling within the spirit and scope of the present disclosure.

The embodiments are provided as examples so that this disclosure will be thorough and complete, and will fully convey the aspects and features of the present disclosure to those skilled in the art. Accordingly, processes, elements, and techniques that are not necessary to those having ordinary skill in the art for a complete understanding of the aspects and features of the present disclosure may not be described.

In the description, when an element (or a region, a layer, a part, etc.) is referred to as being "on", "connected with" or "combined with" another element, it can be directly connected with/bonded on the other element, or one or more intervening elements may be present. In addition, it will also be understood that when an element or layer is referred to as being "between" two elements or layers, it can be the only element or layer between the two elements or layers, or one or more intervening elements or layers may also be present.

Like reference numerals refer to like elements throughout, and duplicative descriptions thereof may not be provided. In the drawings, the thicknesses, ratios, and dimensions of elements may be exaggerated for effective explanation of technical contents. As used herein, the term "and/or" includes any and all combinations of one or more of the associated listed items.

It will be understood that, although the terms "first," "second," "third," etc., may be used herein to describe various elements, components, regions, layers and/or sections, these elements, components, regions, layers and/or sections should not be limited by these terms. These terms are used to distinguish one element, component, region, layer or section from another element, component, region, layer or section. Thus, a first element, component, region, layer or section described below could be termed a second element, component, region, layer or section, without departing from the spirit and scope of the present disclosure.

As used herein, the singular forms "a," "an" and "the" are intended to include the plural forms as well, unless the context clearly indicates otherwise.

Spatially relative terms, such as "beneath," "below," "on" "lower," "under," "above," "upper," and the like, may be used herein for ease of explanation to describe one element or feature's relationship to another element(s) or feature(s) as illustrated in the figures. It will be understood that the spatially relative terms are intended to encompass different orientations of the device in use or in operation, in addition to the orientation depicted in the figures. For example, if the device in the figures is turned over, elements described as "below" or "beneath" or "under" other elements or features would then be oriented "above" the other elements or features. Thus, the example terms "below" and "under" can encompass both an orientation of above and below. The device may be otherwise oriented (e.g., rotated 90 degrees or at other orientations) and the spatially relative descriptors used herein should be interpreted accordingly.

It will be further understood that the terms "comprises," "comprising," "includes," "including," "has," "having," when used in this specification, specify the presence of stated features, numerals, steps, operations, elements, parts, or the combination thereof, but do not preclude the presence or addition of one or more other features, numerals, steps, operations, elements, parts, or the combination thereof. Expressions such as "at least one of," "a plurality of," "one of," and other prepositional phrases, when preceding a list of elements, should be understood as including the disjunctive if written as a conjunctive list and vice versa. For example, the expressions "at least one of a, b, or c," "at least one of a, b, and/or c," "one selected from the group consisting of a, b, and c," "at least one selected from a, b, and c," "at least one from among a, b, and c," "one from among a, b, and c", "at least one of a to c" indicates only a, only b, only c, both a and b, both a and c, both b and c, all of a, b, and c, or variations thereof.

Unless otherwise defined, all terms (including technical and scientific terms) used herein have the same meaning as commonly understood by one of ordinary skill in the art to which this present disclosure belongs. In addition, it will be further understood that terms, such as those defined in commonly used dictionaries, should be interpreted as having a meaning that is consistent with their meaning in the context of the relevant art and/or the present specification, and should not be interpreted in an idealized or overly formal sense, unless expressly so defined herein.

Figure 2:
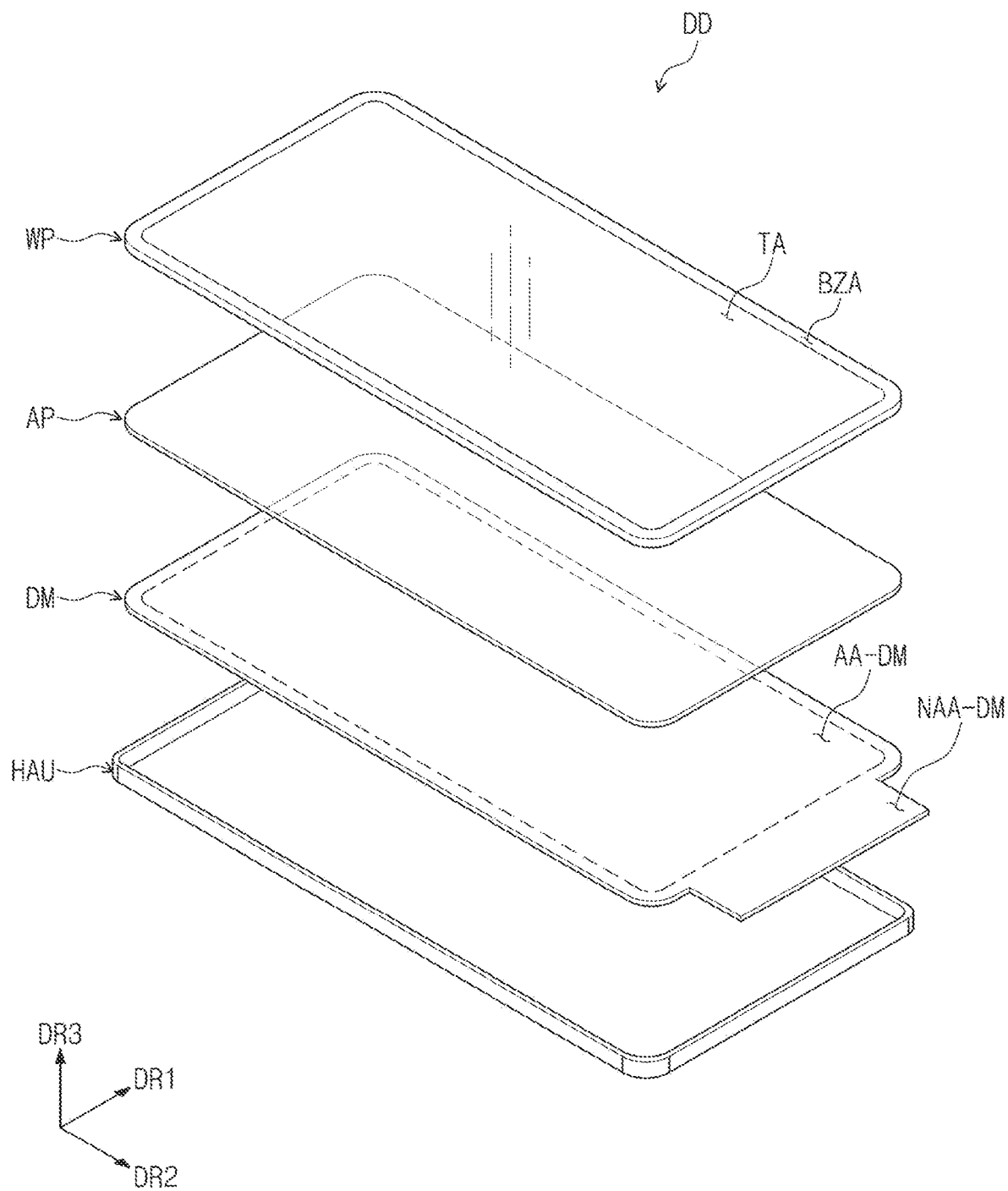
FIG. 2 is an exploded perspective view showing a display device according to one or more embodiments of the present disclosure.

Hereinafter, an adhesive member of one or more embodiments of the present disclosure and a display device including the same will be explained referring to the drawings. FIG. 1 is a perspective view showing a display device according to one or more embodiments of the present disclosure. FIG. 2 is an exploded perspective view showing a display device according to one or more embodiments of the present disclosure.

A display device DD of one or more embodiments, shown in FIG. 1 may be a device activated according to (by) electrical signals. For example, the display device DD may be a personal computer, a laptop computer, a personal digital terminal, a game console, a portable electronic device, a television, a monitor, an external billboard, a car navigation, or a wearable device, but the present disclosure is not limited thereto. FIG. 1 illustrates a cellular phone as the display device DD.

The display device DD according to one or more embodiments may display images IM through a display area DA. The display area DA (in a plan view) may include a plane defined by a first direction axis DR1 and a second direction axis DR2. The display area DA may include a bent curve from at least one side of the plane defined by the first direction axis DR1 and the second direction axis DR2. The display device DD of one or more embodiments, as shown in FIG. 1, is shown to include two bent curves from both sides of the plane defined by the first direction axis DR1 and the second direction axis DR2. However, the shape of the display area DA is not limited thereto. For example, the display area DA may include only the plane defined by the first direction axis DR1 and the second direction axis DR2, and the display area DA may further include at least two or more, for example, four curves bent from four sides of the plane defined by the first direction axis DR1 and the second direction axis DR2.

The display device DD of one or more embodiments may be flexible. The term "flexible" refers to bendable properties and may include all from a completely foldable structure to a structure bendable to a several nm level. For example, the display device DD may be a foldable display device. In one or more embodiments, the display device DD may be rigid.

A non-display area NDA may be an area adjacent to a display area DA. The non-display area NDA may be around (e.g., surround) the display area DA. Accordingly, the shape of the display area DA may substantially be defined by the non-display area NDA. However, this shape is only an illustration, and the non-display area NDA may be disposed adjacent to only one side of the display area DA or may not be provided. The display area DA may be provided in one or more suitable shapes, and the shape is not limited to any one embodiment.

In FIG. 1 and the drawings, a first direction axis DR1 to a third direction axis DR3 are shown, and the directions indicated by the first to third direction axes DR1, DR2 and DR3, explained in the description are a relative concept and may be transformed into other directions. In one or more embodiments, the directions indicated by the first to third direction axes DR1, DR2 and DR3 may be explained as first to third directions, and the same reference symbols may be used, respectively. In embodiments of the present disclosure, the first direction axis DR1 and the second direction axis DR2 may be orthogonal to each other, and the third direction axis DR3 may be a normal line direction with respect to a plane defined by the first direction axis DR1 and the second direction axis DR2.

The thickness direction of the display device DD may be a direction parallel to the third direction axis DR3 that is a normal line direction with respect to the plane defined by the first direction axis DR1 and the second direction axis DR2. In the present description, the front surface (or top surface, upper surface or upper side) and rear surface (or bottom surface, lower surface or lower side) of the members constituting the display device DD may be defined based on the third direction axis DR3. In one or more embodiments, an extended direction of the third direction axis DR3 is parallel to a thickness direction, the front surface (or top surface, upper surface or upper side) refers to a surface (or direction) adjacent to a surface displaying images IM, and the rear surface (or bottom surface, lower surface or lower side) refers to a surface (or direction) separated from the surface displaying images IM.

Referring to FIG. 2, the display device DD may include a display module DM, a window WP disposed on the display module DM, and an adhesive member AP disposed between the display module DM and the window WP. In one or more embodiments, the display device DD may further include a housing HAU receiving the display module DM.

In the display device DD shown in FIG. 1 and FIG. 2, the window WP and the housing HAU may be combined to form the appearance of the display device DD. The housing HAU may be disposed under the display module DM. The housing HAU may include a material having relatively high rigidity. For example, the housing HAU may include multiple frames and/or plates composed of glass, plastics and/or metals. The housing HAU may provide a certain receiving space. The display module DM may be received in the receiving space for protection from external impact.

The display module DM may be activated by electrical signals. The display module DM may be activated to display images IM (see, e.g., FIG. 1) on the display area DA (see, e.g., FIG. 1). On the display module DM, an active area AA-DM and a surrounding area (e.g., an area around the active area) NAA-DM may be defined. The active area AA-DM may be an area activated by the electrical signals. The surrounding area (e.g., the area around the active area) NAA-DM may be an area positioned adjacent to at least one side of the active area AA-DM. In the surrounding area (e.g., the area around the active area) NAA-DM, circuits or wirings for driving the active area AA-DM may be disposed.

Figure 5:
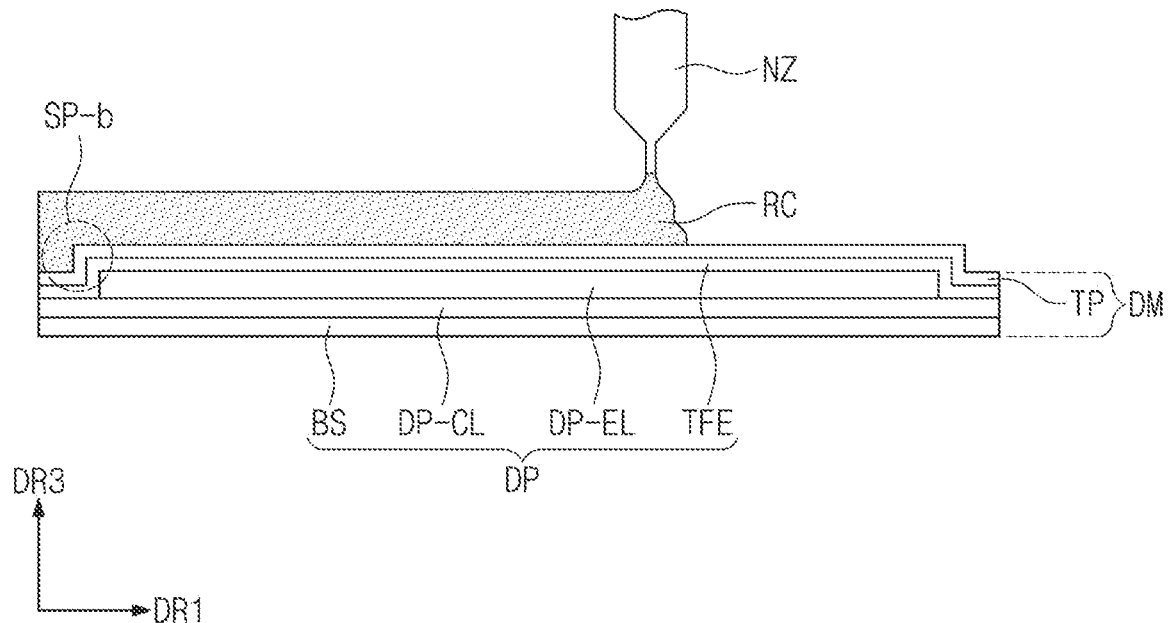
FIG. 5 is a diagram schematically showing a step of manufacturing a display device according to one or more embodiments of the present disclosure.

In one or more embodiments, the adhesive member AP may include a polymer derived from a resin composition RC (see, e.g., FIG. 5). In the method of manufacturing a display device according to one or more embodiments, which will be explained in more detail later, the adhesive member AP may be formed from the resin composition RC (see, e.g., FIG. 5). Through the adhesive member AP, the display module DM and the window WP may be combined. The adhesive member AP may satisfy a certain glass transition temperature and a loss tangent (tan δ) at a temperature of about −40° C., and may show easy rework properties at a temperature of about −40° C.

The window WP may include a transmission area TA and a bezel area BZA. The transmission area TA may overlap at least a portion of the active area AA-DM of the display module DM. The transmission area TA may be an optically transparent area. Images IM (see, e.g., FIG. 1) may be provided through the transmission area TA to a user.

The bezel area BZA may be an area having relatively low light transmittance in contrast to the transmission area TA. The bezel area BZA may define the shape of the transmission area TA. The bezel area BZA may be adjacent to the transmission area TA and may be around (e.g., may surround) the transmission area TA.

The bezel area BZA may have certain color. The bezel area BZA may cover the surrounding area (e.g., the area around the active area) NAA-DM of the display module DM and block or substantially block the surrounding area (e.g., the area around the active area) NAA-DM from being recognized by (e.g., seen from) the outside. However, the present disclosure is not limited thereto, and the bezel area BZA may be disposed adjacent to only one side of the transmission area TA, or at least a portion thereof may not be provided.

Figure 3:
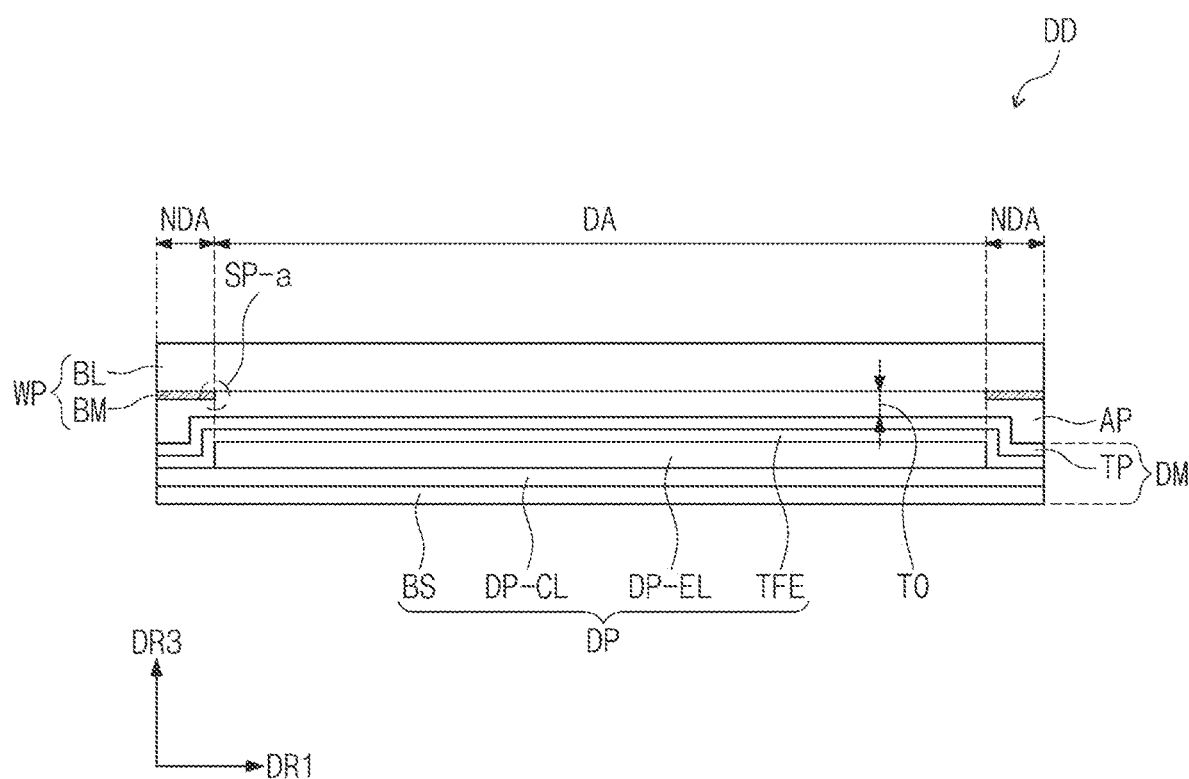
FIG. 3 is a cross-sectional view showing a display device according to one or more embodiments of the present disclosure.

FIG. 3 is a cross-sectional view showing the display module DM, the adhesion member AP and the window WP of FIG. 2. FIG. 3 may be a cross-sectional view showing the display device DD according to one or more embodiments of the present disclosure.

Referring to FIG. 3, the display module DM may include a display panel DP and an input sensing part TP disposed on the display panel DP. The display panel DP may include a base substrate BS, a circuit layer DP-CL disposed on the base substrate BS, a display element layer DP-EL disposed on the circuit layer DP-CL, and an encapsulation layer TFE covering the display element layer DP-EL. Between the display panel DP and the window WP, the adhesive member AP may be disposed.

the configuration of the display panel DP, shown in FIG. 3, etc., is an illustration, and the configuration of the display panel DP is not limited thereto. For example, the display panel DP may include a liquid crystal display device, and in such a case, the encapsulation layer TFE may not be provided.

The base substrate BS may provide a base surface on which the circuit layer DP-CL is disposed. The base substrate BS may be a flexible substrate of which bending, folding, rolling, and/or the like is possible. The base substrate BS may be a glass substrate, a metal substrate, or a polymer substrate. However, the present disclosure is not limited thereto, and the base substrate BS may include an inorganic layer, an organic layer or a composite material layer.

The circuit layer DP-CL may include an insulating layer, a semiconductor pattern, a conductive pattern, and a signal line. For example, the circuit layer DP-CL may include a switching transistor and a driving transistor for driving the light emitting elements of the display element layer DP-EL.

The display element layer DP-EL may include a light emitting element emitting light. For example, the light emitting element may include an organic light emitting material, an inorganic light emitting material, an organic-inorganic light emitting material, a quantum dot, a quantum rod, a micro LED (e.g., an LED on a micro scale), or a nano LED (e.g., an LED on a nano scale).

The encapsulation layer TFE may be disposed on display element layer DP-EL. The encapsulation layer TFE may protect the display element layer DP-EL from foreign materials such as humidity, oxygen, and/or dust particles. The encapsulation layer TFE may include at least one inorganic layer. In one or more embodiments, the encapsulation layer TFE may include at least one organic layer and at least one inorganic layer. For example, the encapsulation layer TFE may include an inorganic layer, an organic layer and an inorganic layer, laminated in order.

The input sensing part TP may be disposed on the display panel DP. For example, the input sensing part TP may be disposed directly on the encapsulation layer TFE of the display panel DP. The input sensing part TP may sense an external pressure to change into (e.g., that may be converted into) a certain input signal and provide the display panel DP with the input signal. For example, in the display device DD of one or more embodiments, the input sensing part TP may be a touch sensing part sensing a touch. The input sensing part TP may recognize the direct touch of a user, the indirect touch of a user, the direct touch of an object, the indirect touch of an object, and/or the like.

The input sensing part TP may sense at least one of (among) the position of the touch or the intensity (pressure) of the touch, applied from the outside. In one or more embodiments, the input sensing part TP may have one or more suitable structures or may be constituted utilizing one or more suitable materials, without limitation. The input sensing part TP may include multiple sensing electrodes for sensing the pressure from the outside. The sensing electrodes may sense the pressure from the outside by an electrostatic capacitance manner. The display panel DP may receive input signals from the input sensing part TP and may produce images corresponding to the input signals.

The window WP may include a base layer BL and a print layer BM. Though not shown, the window WP may further include at least one functional layer provided on the base layer BL. For example, the functional layer may be a hard coating layer, an anti-fingerprint coating layer, and/or the like, but the present disclosure is not limited thereto.

The base layer BL may be a glass substrate. In one or more embodiments, the base layer BL may be a plastic substrate. For example, the base layer BL may be formed by utilizing polyimide, polyacrylate, polymethylmethacrylate, polycarbonate, polyethylenenaphthalate, polyvinylidene chloride, polyvinylidene difluoride, polystyrene, an ethylene-vinyl alcohol copolymer, or combinations thereof.

The print layer BM may be disposed on one surface of the base layer BL. The print layer BM may be provided under the base layer BL, adjacent to the display module DM. The print layer BM may be disposed at an edge area of the base layer BL. The print layer BM may be an ink printed layer. In one or more embodiments, the print layer BM may be a layer formed by including a pigment and/or a dye. In the window WP, the bezel area BZA may be a part where the print layer BM is provided.

The adhesive member AP may be disposed under the window WP. In the window WP, a step SP-a may be present between the base layer BL where the print layer BM is not provided and the print layer BM. The adhesive member AP formed from the resin composition RC (see, e.g., FIG. 5) according to one or more embodiments has excellent or suitable flexibility and high adhesiveness, and may be attached to the window WP without separation at the step SP-a portion.

The thickness T0 of the adhesive member AP may be about 50 μm to about 200 μm. For example, the adhesive member AP may have a thickness T0 of about 50 μm to about 200 μm. However, this is an illustration, and the thickness T0 of the adhesive member AP is not limited thereto.

In one or more embodiments, the adhesive member AP may have a 180° peel strength with respect to a glass substrate and a polymer substrate of about 2000 gf/25 mm or more. The adhesive member AP may have a 180° peel strength of about 2000 gf/25 mm or more with respect to a glass substrate and a polymer substrate at a temperature of about 25° C. The temperature of about 25° C. may be room temperature. An adhesive member having a 180° peel strength with respect to a glass substrate and/or a polymer substrate of less than about 2000 gf/25 mm, has low adhesion reliability, and is peeled off from the configuration of the display module DM or the window WP. In contrast, an adhesive member having a 180° peel strength of about 2000 gf/25 mm or more with respect to a glass substrate and/or a polymer substrate at a temperature of about 25° C., may show excellent or suitable adhesion reliability. In one or more embodiments, a display device DD including an adhesive member having a 180° peel strength of about 2000 gf/25 mm or more with respect to a glass substrate and/or a polymer substrate at a temperature of about 25° C., may show excellent or suitable adhesion reliability.

In one or more embodiments, the glass transition temperature (Tg) of the adhesive member AP may be about −10° C. or more and (to) less than about 10° C. An adhesive member having a glass transition temperature of less than about −10° C. may show an increased loss tangent (tan δ) at a temperature of about −40° C., and the agglomeration of a polymer constituting the adhesive member is very low. Accordingly, in the adhesive member having a glass transition temperature of less than about −10° C., during reworking at a temperature of about −40° C., the breakage of the adhesive member may occur. An adhesive member having a glass transition temperature of 10° C. or more has high agglomeration of a polymer, and during reworking at a temperature of about −40° C., the breakage of the window may occur.

Rework refers to the detaching the window WP (see, e.g., FIG. 9) from the adhesive member AP at a temperature of about −40° C., and the providing of the detached window WP (see, e.g., FIG. 9) to the adhesive member AP again, which will be explained in more detail in the explanation of the method of manufacturing a display device according to one or more embodiments, hereinbelow. At the temperature of about −40° C., in a case in which the window detaches from the adhesive member having a glass transition temperature of less than about −10° C., the adhesive member may partially remain on the detached window, and there may be damage of the adhesive member. At the temperature of about −40° C., in a case in which the window detaches from the adhesive member having a glass transition temperature of about 10° C. or more, there may be damage of the window. In contrast, in one or more embodiments, the adhesive member AP having a glass transition temperature of about −10° C. or more and (to) less than about −10° C. may have optimized agglomeration of a polymer, and regarding detachment of the window WP from the adhesive member AP at a temperature of about −40° C., excellent or suitable reliability may be shown.

According to one or more embodiments, the loss tangent (tan δ) of the adhesive member AP at a temperature of about −40° C. may be about 0.01 or more and (to) less than about 0.3. The loss tangent (tan δ) is the ratio of loss modulus with respect to storage modulus. The adhesive member AP having a loss tangent (tan δ) at a temperature of about −40° C. of less than about 0.01 has low adhesion reliability at a temperature of about −10° C., and is peeled off from the configuration of the display module DM or the window WP. The temperature of about −10° C. is included in the temperature range of environments where a user uses the display device DD, and in a display device including an adhesive member having a loss tangent (tan δ) at a temperature of about −40° C. of less than about 0.01, the adhesive member may be peeled off during use of a display device.

In a case in which the window is detached from an adhesive member having a loss tangent (tan δ) of about 0.3 or more at a temperature of about −40° C., the adhesive member may partially remain on the detached window, and the adhesive member may be damaged. In contrast, in one or more embodiments, an adhesive member having a loss tangent (tan δ) of less than about 0.3 at a temperature of about −40° C. may show easy reworking properties. At a temperature of about −40° C., in a case in which the window WP is detached from an adhesive member AP having a loss tangent (tan δ) of less than about 0.3, the damage of the adhesive member AP may not occur.

Figure 4:
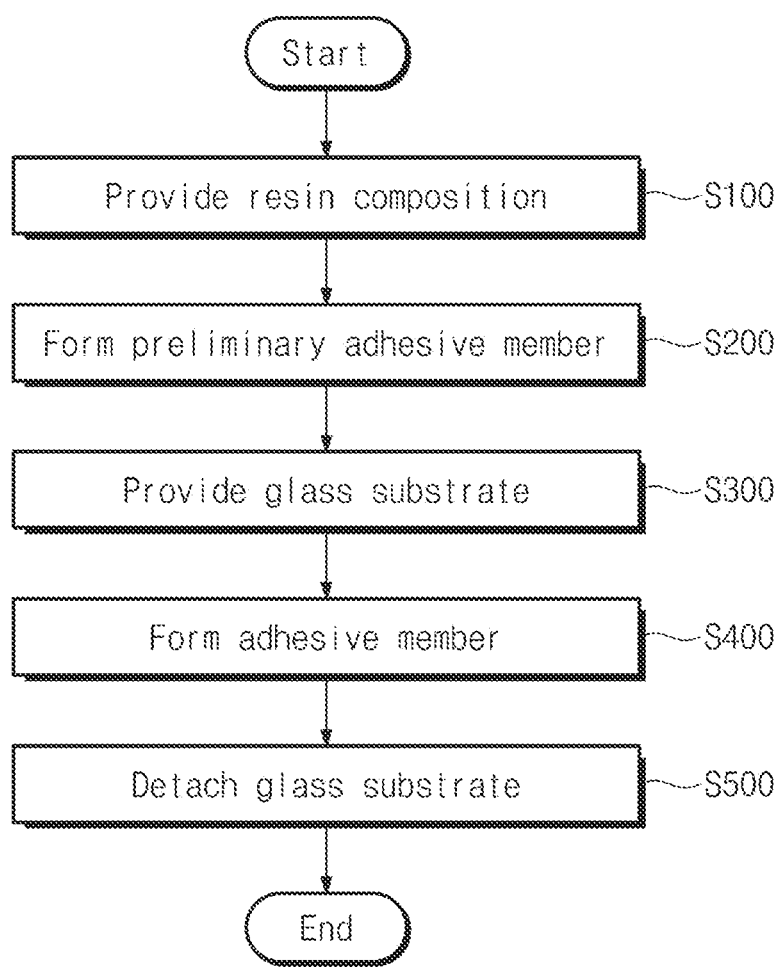
FIG. 4 is a flowchart showing a method of manufacturing a display device according to one or more embodiments of the present disclosure.

The display device DD of one or more embodiments may be formed by a method of manufacturing a display device according to one or more embodiments of the present disclosure. FIG. 4 is a flowchart showing a method of manufacturing a display device according to one or more embodiments of the present disclosure. FIG. 5 to FIG. 9 schematically show the steps of manufacturing a display device according to one or more embodiments of the present disclosure. Hereinafter, in the explanation on the method of manufacturing a display device of one or more embodiments referring to FIG. 4 to FIG. 9, overlapping contents with those explained referring to FIG. 1 to FIG. 3 may not be explained again, and different features will be mainly explained.

Referring to FIG. 4, the method of manufacturing a display device according to one or more embodiments may include a step (e.g., an active act or task) of providing a resin composition (S100), a step of forming a preliminary adhesive member (S200), a step of providing a glass substrate (S300), a step of forming an adhesive member (S400), and a step of detaching the glass substrate (S500). FIG. 5 is a diagram showing a step of providing a resin composition on a substrate (S100), and a resin composition RC is provided through a nozzle NZ.

A substrate is a member on which the resin composition RC is provided, and in FIG. 5, the resin composition RC is provided on one surface of a display module DM. Different from FIG. 5, the resin composition RC may be provided on one side of the display panel DP or on one side of a window WP, and a preliminary adhesive member P-AP (see, e.g., FIG. 7) may be formed from the resin composition RC. The preliminary adhesive member P-AP may be laminated on one surface of the display module DM, and on the display module DM, the preliminary adhesive member P-AP and the window WP may be laminated in order (see, e.g., FIG. 7).

In one or more embodiments, the resin composition RC may be provided on a separate substrate, and a preliminary adhesive member P-AP may be formed from the resin composition RC. The preliminary adhesive member P-AP thus formed may be provided on the display module DM. When the resin composition RC is provided on a separate substrate to form a preliminary adhesive member P-AP, one surface of the separate substrate may undergo release treatment. The separate substrate may be an arbitrary substrate provided for the formation of the preliminary adhesive member P-AP.

The resin composition RC may be provided by an inkjet printing method or a dispensing method. The resin composition RC may be provided at a temperature of about 30° C. When the resin composition is provided at a temperature of less than about 30° C., the stable maintenance of the temperature is not easy, and the temperature change may deteriorate manufacturing reliability. When the resin composition is provided at a temperature greater than about 30° C., the volatility of a monomer (monofunctional monomer and/or polyfunctional monomer) included in the resin composition may increase. Accordingly, when the resin composition is provided at a temperature greater than about 30° C., the formation of the adhesive member from the resin composition is not easy. In contrast, when the resin composition RC is provided at a temperature of about 30° C., the formation of the adhesive member AP according to one or more embodiments may be easy or easier.

The resin composition RC of one or more embodiments may have a viscosity measured based on JISK 2283 at a temperature of about 30° C. of about 5 mPa·s or more and (to) less than about 20 mPa·s. A resin composition having a viscosity of less than about 5 mPa·s, measured based on JISK 2283 at a temperature of about 30° C., may induce flowing during the provision of the resin composition, or may not produce a coating with a substantially uniform amount and/or a substantially uniform thickness. The term "flowing" refers to a flowing phenomenon of a composition, deviating from the target member (e.g., the region where the composition should cover, or the region targeted by the composition). A resin composition having a viscosity of greater than about 20 mPa·s measured based on JISK 2283 at a temperature of about 30° C., may not be easily discharged, and blockage may occur at the nozzle NZ.

In one or more embodiments, the discharge of the resin composition RC having a viscosity of about 5 mPa·s or more and less than about 20 mPa·s measured based on JISK 2283 at a temperature of about 30° C., from equipment such as the nozzle NZ may be easy, and a coating with a substantially uniform amount and a substantially uniform thickness may be possible. The resin composition RC having a viscosity of about 5 mPa·s or more and less than about 20 mPa·s, measured based on JISK 2283 at a temperature of about 30° C., may be provided while covering the step at the step SP-b part of the display module DM.

The resin composition RC of one or more embodiments may include at least one urethane (meth)acrylate oligomer, at least one polyfunctional (meth)acrylate monomer, and at least one photoinitiator. In one or more embodiments, the resin composition RC may further include at least one monofunctional (meth)acrylate monomer.

In the resin composition RC of one or more embodiments, the at least one urethane (meth)acrylate oligomer may include two (meth)acryloyl groups per oligomer unit. In one or more embodiments, the (meth)acryloyl group represents an acryloyl group or a methacryloyl group, and the (meth)acryl represents acryl or methacryl.

For example, the resin composition RC may include one type or kind of a urethane (meth)acrylate oligomer. In one or more embodiments, the resin composition RC may include two or more types (kinds) of urethane (meth)acrylate oligomers. At least one of (among) the two or more types (kinds) of the urethane (meth)acrylate oligomers may include two (meth)acryloyl groups per oligomer unit.

For example, the resin composition RC may include at least one of (among) UV-3700B (urethane acrylate, product of Mitsubishi Chemical Inc.), UV-3300B (urethane acrylate, product of Mitsubishi Chemical Inc.) and/or UN-7700 (urethane acrylate, Negami Chemical Industrial Co., Ltd), as the urethane (meth)acrylate oligomer. However, these are illustrations, and the present disclosure is not limited thereto.

In one or more embodiments, the urethane (meth)acrylate oligomer may have a weight-average molecular weight (Mw) of about 10,000 or more and (to) less than about 40,000. The urethane (meth)acrylate oligomer having a weight-average molecular weight of about 10,000 or more is included in the resin composition RC in an oligomer state having a relatively high degree of polymerization, and may maintain a high degree of polymerization after photocuring. Accordingly, the adhesive member AP (see, e.g., FIG. 3) formed from the resin composition RC of one or more embodiments may show excellent or suitable peel strength.

The resin composition RC may include the urethane (meth)acrylate oligomer in about 1 wt % or more and (to) less than about 10 wt %, based on the total weight of the resin composition RC. When the resin composition RC includes multiple urethane (meth)acrylate oligomers, the sum of the weights of the multiple urethane (meth)acrylate oligomers may be about 1 wt % or more and (to) less than about 10 wt % based on the total weight of the resin composition RC. The resin composition RC including about 1 wt % or more and (to) less than about 10 wt % of the urethane (meth)acrylate oligomer based on the total weight of the resin composition RC may have a viscosity measured based on JISK 2283 at a temperature of about 30° C. of about 5 mPa·s or more and (to) less than about 20 mPa·s. Accordingly, the resin composition RC including about 1 wt % or more and (to) less than about 10 wt % of the urethane (meth)acrylate oligomer based on the total weight of the resin composition RC may be provided by an inkjet printing method or a dispensing method and may be coated with a substantially uniform amount and in a substantially uniform thickness.

In contrast, a resin composition including less than about 1 wt % of the urethane (meth)acrylate oligomer based on the total weight of the resin composition has a very small viscosity, and flowing may occur during providing the resin composition. A resin composition including about 10 wt % or more of the urethane (meth)acrylate oligomer based on the total weight of the resin composition has a very high viscosity, and coating with a substantially uniform thickness and/or a substantially uniform amount is difficult.

The polyfunctional (meth)acrylate monomer may include multiple (meth)acryloyl groups per monomer unit. For example, the (meth)acrylate monomer may include 2 to 4 (meth)acryloyl groups. The term "multifunctional" refers to multiple functional groups.

For example, the resin composition RC may include at least one of (among) viscoat #260 (1,9-nonanediol dimethacrylate, Osaka Organic Chemical Industry Ltd), light acrylate TMP-A (trimethylolpropane trimethacrylate, Kyoeisha Chemical Co., Ltd), and/or light acrylate PE-4A (pentaerythritol triacrylate, Kyoeisha Chemical Co., Ltd), as the polyfunctional (meth)acrylate monomer. For example, in the resin composition RC, the polyfunctional (meth)acrylate monomer may be included as a crosslinking agent. However, these are illustrations, and the present disclosure is not limited thereto.

In one or more embodiments, the polyfunctional (meth)acrylate monomer may have a weight-average molecular weight of about 100 or more and (to) less than about 400. An adhesive member AP formed from the resin composition RC including the polyfunctional (meth)acrylate monomer having a weight-average molecular weight of about 100 or more and (to) less than about 400 may satisfy the glass transition temperature and loss tangent according to one or more embodiments. In one or more embodiments, the glass transition temperature of the adhesive member AP may be about −10° C. or more and (to) less than about 10° C., and the loss tangent (tan δ) of the adhesive member AP at a temperature of about −40° C. may be less than about 0.3.

Based on the total weight of the resin composition RC, the resin composition RC may include about 0.2 wt % or more and (to) less than about 2 wt % of the polyfunctional (meth)acrylate monomer. An adhesive member formed from a resin composition including less than about 0.2 wt % of the polyfunctional (meth)acrylate monomer based on the total weight of the resin composition has degraded crosslinking density, and breakage may occur during rework. An adhesive member formed from a resin composition including about 2 wt % or more of the polyfunctional (meth)acrylate monomer based on the total weight of the resin composition may show low adhesiveness, and may be peeled off from a display module and/or window. In one or more embodiments, an adhesive member formed from the resin composition including about 0.2 wt % or more and (to) less than about 2 wt % of the polyfunctional (meth)acrylate monomer based on the total weight of the resin composition may not induce breakage during rework and may show excellent or suitable adhesion reliability.

The resin composition RC may include at least one photoinitiator. The photoinitiator may include a radical polymerization initiator. When the resin composition RC includes multiple photoinitiators, different photoinitiators may be activated by ultraviolet light having different central wavelengths.

For example, the photoinitiator may include at least one of (among) 2,2-dimethoxy-1,2-diphenylethan-1-one, 1-hydroxy cyclohexyl-phenylketone), 2-hydroxy-2-methyl-1-phenyl-1-propanone, 2-hydroxy-1-[4-(2-hydroxyethoxy) phenyl]-2-methyl-1-propanone), and/or 2-hydroxy-1-{4-[4-(2-hydroxy-2-methyl-propionyl)-benzyl]-phenyl}-2-methylpropan-1-one.

In one or more embodiments, the photoinitiator may include at least one of (among) 2-methyl-1[4-(methylthio) phenyl]-2-morpholinopropan-1-one, 2-benzyl-2-dimethylamino-1-(4-morpholinophenyl)-butanone-1, 2-dimethylamino-2-(4-methyl-benzyl)-1-(4-morpholin-4-yl-phenyl)-butan-1-one, 2,4,6-trimethylbenzoyl-diphenylphosphine oxide, ethyl(2,4,6-trimethylbenzoyl)phenyl phosphinate), phenylbis(2,4,6-trimethylbenzoyl)phosphine oxide, [1-(4-phenylsulfanylbenzoyl)heptylideneamino]benzoate, [1-[9-ethyl-6-(2-methylbenzoyl)carbazol-3-yl]ethylideneamino] acetate, and/or bis(2,4-cyclopentadienyl)bis[2,6-difluoro-3-(1-pyrryl)phenyl] titanium(IV). In one or more embodiments, the resin composition RC may include at least one of (among) Omnirad 819 (IGM Resins Co.) and/or Omnirad 184 (IGM Resins Co.) as the photoinitiator. Omnirad 819 (IGM Resins Co.) and Omnirad 184 (IGM Resins Co.) are radical polymerization initiators.

The resin composition RC may include about 85 wt % or more and (to) about 97 wt % or less of the monofunctional (meth)acrylate monomer based on the total weight of the resin composition RC. An adhesive member AP formed from the resin composition RC including about 85 wt % or more and (to) about 97 wt % or less of the monofunctional (meth)acrylate monomer based on the total weight of the resin composition RC may satisfy the glass transition temperature and loss tangent according to one or more embodiments. In one or more embodiments, the glass transition temperature of the adhesive member AP may be about −10° C. or more and (to) less than about 10° C., and the loss tangent (tan δ) of the adhesive member AP at a temperature of about −40° C. may be less than about 0.3.

For example, the monofunctional (meth)acrylate monomer may be an acrylate monomer or a methacrylate monomer including one acryloyl group or one methacryloyl group. In the resin composition RC, the monofunctional (meth)acrylate monomer may include at least one of (among) an alicyclic (meth)acrylate, hydroxyl group-containing (meth)acrylate, alkyl (meth)acrylate, and/or aromatic (meth)acrylate.

The resin composition RC of one or more embodiments may further include less than about 1 wt % of an organic solvent based on the total weight of the resin composition RC. For example, the resin composition RC may include methyl ethyl ketone (MEK) as the organic solvent. A resin composition further including about 1 wt % or more of the organic solvent based on the total weight of the resin composition shows low adhesiveness after curing. Accordingly, an adhesive member formed from a resin composition including about 1 wt % or more of the organic solvent based on the total weight of the resin composition has low adhesion reliability. A resin composition including about 1 wt % or more of the organic solvent based on the total weight of the resin composition has low curing reliability. Accordingly, an adhesive member could not be formed by curing the resin composition RC including about 1 wt % or more of the organic solvent based on the total weight of the resin composition. In one or more embodiments, the resin composition including less than about 1 wt % of the organic solvent based on the total weight of the resin composition may have excellent or suitable curing reliability and may show excellent or suitable adhesion reliability after curing.

The method of manufacturing a display device of one or more embodiments may not include (e.g., may exclude) a step of drying the resin composition RC. The resin composition RC of one or more embodiments may not require a drying process after applying the resin composition RC. A resin composition applied by an inkjet method, requires a drying process before providing light, but the resin composition RC of one or more embodiments may not require a drying process. Accordingly, the method of manufacturing a display device of one or more embodiments may show excellent or suitable manufacturing efficiency.

Figure 6:
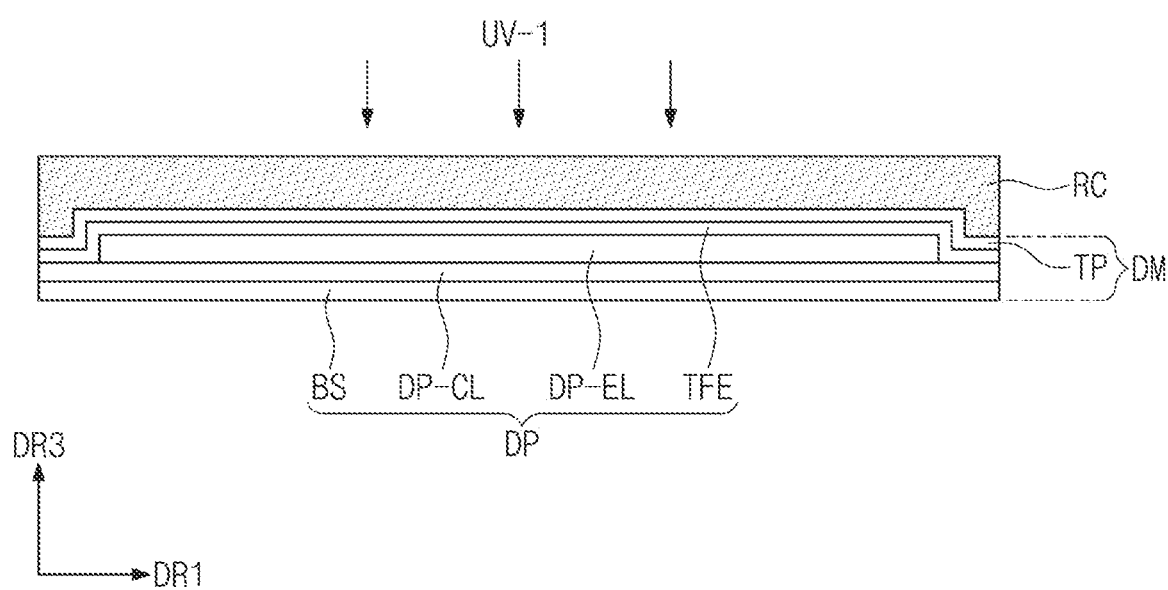
FIG. 6 is a diagram schematically showing a step of manufacturing a display device according to one or more embodiments of the present disclosure.
Figure 7:
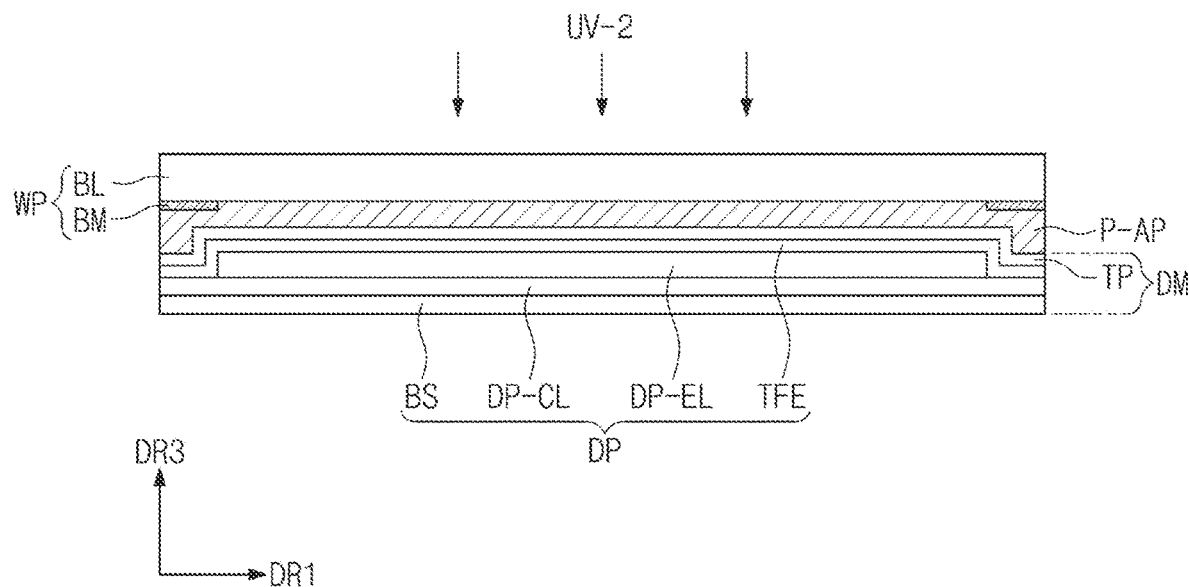
FIG. 7 is a diagram schematically showing a step of manufacturing a display device according to one or more embodiments of the present disclosure.
Figure 8:
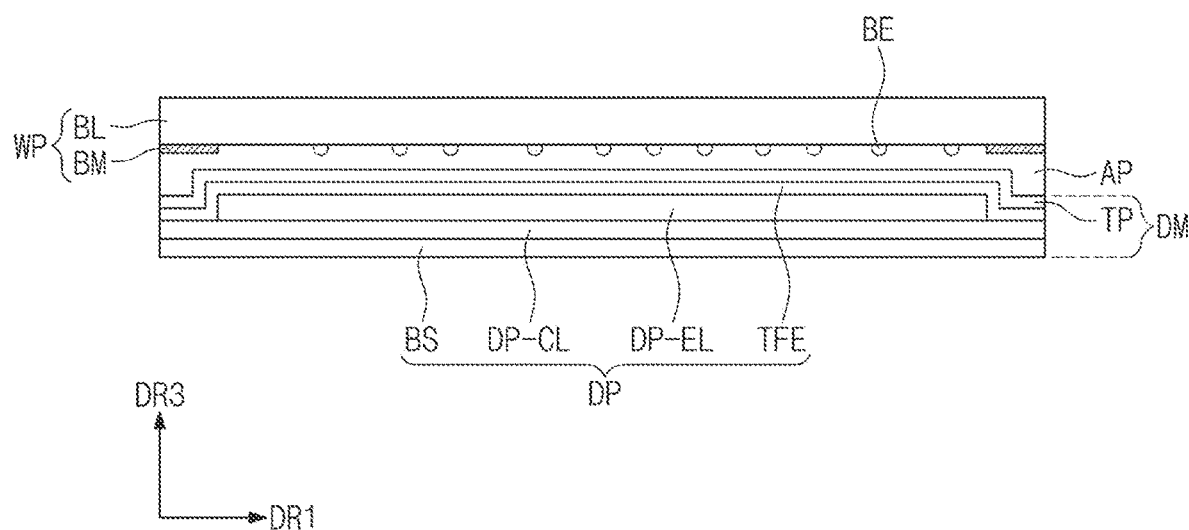
FIG. 8 is a diagram schematically showing a step of manufacturing a display device according to one or more embodiments of the present disclosure.

The resin composition RC may be cured by light. FIG. 6 shows a step of providing the resin composition RC applied with first light UV-1 to form a preliminary adhesive member P-AP (see, e.g., FIG. 7). FIG. 7 and FIG. 8 show steps of disposing a window WP on the preliminary adhesive member P-AP and providing the preliminary adhesive member P-AP with second light UV-2 to form an adhesive member AP (see, e.g., FIG. 8). The second light UV-2 may pass through the window WP and be provided to the preliminary adhesive member P-AP.

The first light UV-1 and the second light UV-2 may be light in an ultraviolet range. The total dosage of the second light UV-2 may be greater than the total dosage of the first light UV-1. For example, the total dosage of the first light UV-1 may be about 200 mJ/cm$^2$ or more and (to) less than about 1000 mJ/cm$^2$. The total dosage of the second light UV-2 may be about 3500 mJ/cm$^2$ or more and (to) less than about 4500 mJ/cm$^2$. However, these are illustrations, and the total dosage of the first light UV-1 and the total dosage of the second light UV-2 are not limited thereto.

Figure 9:
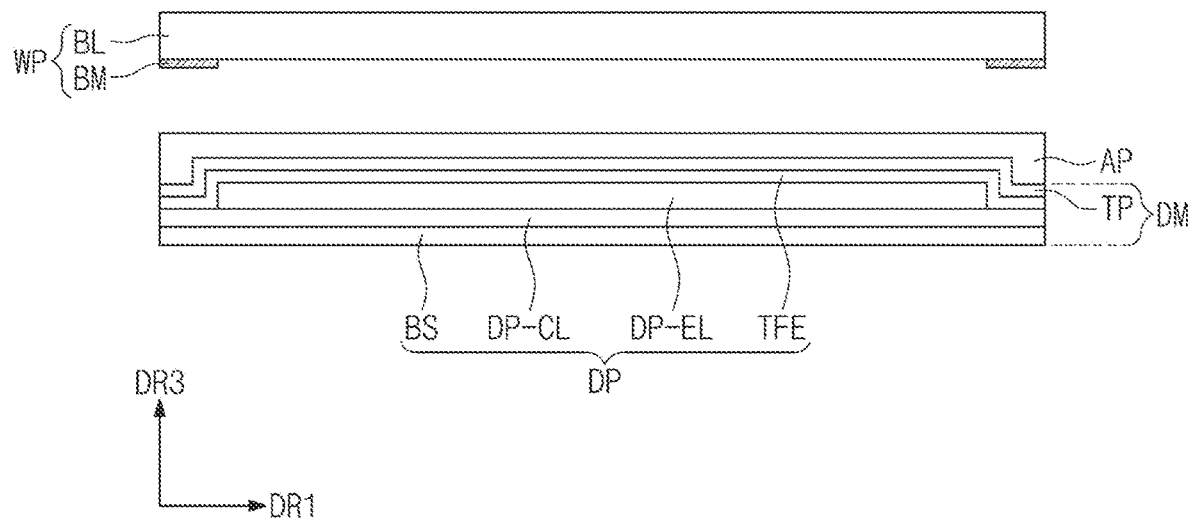
FIG. 9 is a diagram schematically showing a step of manufacturing a display device according to one or more embodiments of the present disclosure.

FIG. 8 shows the incorporation of bubbles BE between the adhesive member AP and the window WP. FIG. 9 shows a detached window WP from the adhesive member AP for re-attaching the window WP without the incorporation of bubbles BE. At a temperature of about −40° C., the window WP may be detached from the adhesive member AP. At a temperature of about −40° C., the adhesiveness of the adhesive member AP onto the window WP may be reduced, and the window WP may be detached from the adhesive member AP. For example, the window WP may be detached by the physical force. The detached window WP may be provided onto the adhesive member AP again so as to be attached onto a target adhesion position without incorporation of bubbles and foreign materials, to constitute the display device DD (see, e.g., FIG. 3) of one or more embodiments.

As described above, the adhesive member AP formed from the resin composition RC (see, e.g., FIG. 5) of one or more embodiments may have a glass transition temperature of about −10° C. or more and (to) less than about 10° C., and a loss tangent (tan δ) at a temperature of about −40° C. of less than about 0.3. Accordingly, at a temperature of about −40° C., the window WP may be detached from the adhesive member AP, and after detaching, the adhesive member AP and the window WP may show excellent or suitable reliability. Accordingly, the detached window WP may be provided again and attached to the adhesive member AP. The temperature of about −40° C. may be a temperature not damaging the configuration of the display module DM. In some embodiments, in case of forming an adhesive member which is reworkable at a high temperature, the display module DM may be damaged under high-temperature environments for reworking. When an adhesive member of which rework at room temperature is easy, is formed, the adhesive member may be peeled off during utilization of the display device including the adhesive member.

Generally, when bubbles and/or foreign materials are incorporated, or a window is out of a target adhesion position during attaching an adhesive member and a window (for example, a glass substrate), the window could not be detached again from the adhesive member. Accordingly, a large amount of waste materials was produced, manufacturing costs were increased, and manufacturing reliability was deteriorated.

The method of manufacturing a display device of one or more embodiments includes a step of forming an adhesive member AP from the resin composition RC according to one or more embodiments, and easy detaching of a window WP from the adhesive member AP at a low temperature of about −40° C. may be realized or shown. According to the method of manufacturing a display device of one or more embodiments, manufacturing costs may be saved and manufacturing efficiency may be improved.

Figure 10:
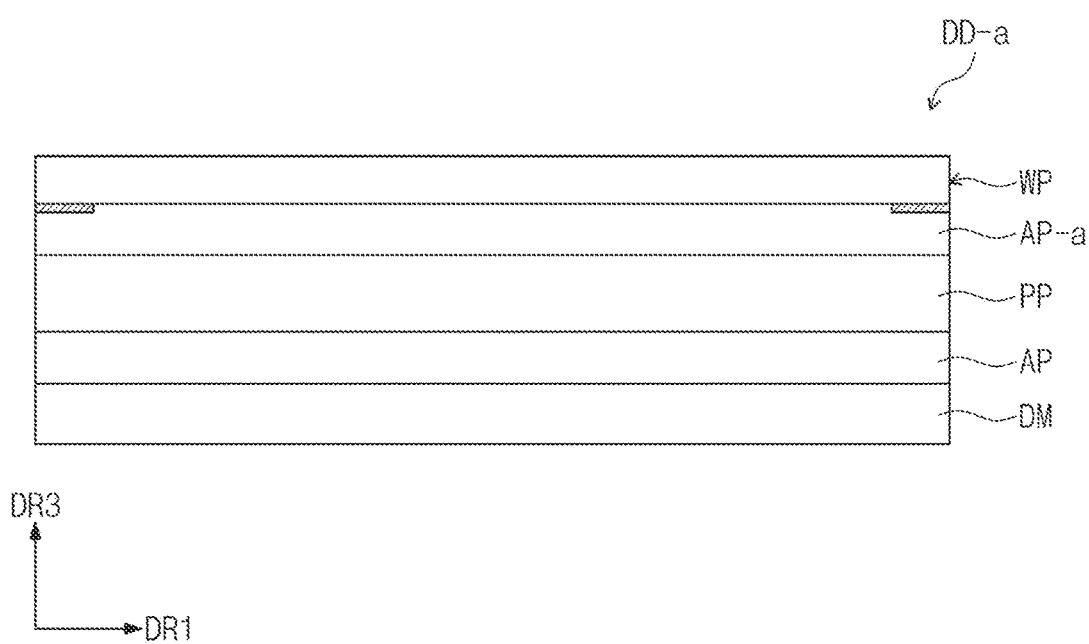
FIG. 10 is a cross-sectional view showing a display device according to one or more embodiments of the present disclosure.

FIG. 10 is a cross-sectional view showing a display device of one or more embodiments of the present disclosure. Hereinafter, the overlapping contents with those explained referring to FIG. 1 to FIG. 9 may not be explained again on the display device shown in FIG. 10, and different features will be mainly explained.

Compared to the display device DD explained referring to FIG. 2 and FIG. 3, a display device DD-a shown in FIG. 10 may further include a light controlling layer PP and an optical adhesive layer AP-a. The display device DD-a of one or more embodiments may further include a light controlling layer PP disposed between the adhesive member AP and the window WP, and an optical adhesive layer AP-a disposed between the light controlling layer PP and the window WP.

The light controlling layer PP may be disposed on the display panel DP and control reflecting light on the display panel DP by external light. The light controlling layer PP may include, for example, a polarization plate or a color filter layer.

The optical adhesive layer AP-a may be formed from the resin composition RC according to one or more embodiments. The optical adhesive layer AP-a including a polymer derived from the resin composition RC may have a glass transition temperature of about −10° C. or more and (to) less than about 10° C., and a loss tangent (tan δ) at a temperature of about −40° C. of less than about 0.3. In one or more embodiments, the optical adhesive layer AP-a may have a 180° peel strength with respect to a glass substrate and a polymer substrate of about 2000 gf/25 mm or more. The display device DD-a including the optical adhesive layer AP-a may show excellent or suitable reliability.

Figure 11:
FIG. 11 is a cross-sectional view showing a display device according to one or more embodiments of the present disclosure.

FIG. 11 is a cross-sectional view showing a display device of one or more embodiments of the present disclosure. Hereinafter, the overlapping contents with those explained referring to FIG. 1 to FIG. 10 may not be explained again on the display device shown in FIG. 11, and different features will be mainly explained.

Compared to the display device DD explained referring to FIG. 2 and FIG. 3, a display device DD-b shown in FIG. 11 may further include a light controlling layer PP, an optical adhesive layer AP-a, and an interlayer adhesive layer PIB. The display device DD-b of one or more embodiments, shown in FIG. 11 may further include a light controlling layer PP disposed between the adhesive member AP and the window WP, and an optical adhesive layer AP-a disposed between the light controlling layer PP and the window WP, as in the display device DD-a of one or more embodiments, shown in FIG. 10.

In the display device DD-b of one or more embodiments, the adhesive member AP may be provided between the display panel DP and an input sensing part TP. For example, the input sensing part TP may not be disposed directly on the display panel DP, but the display panel DP and the input sensing part TP may be combined with each other by the adhesive member AP. For example, the adhesive member AP may be disposed between the encapsulation layer TFE (see, e.g., FIG. 3) of the display panel DP and the input sensing part TP.

Under the light controlling layer PP, an interlayer adhesive layer PIB may be provided. The interlayer adhesive layer PIB may be disposed between the input sensing part TP and the light controlling layer PP and may be formed utilizing an adhesive material having excellent or suitable prevention of moisture permeation. For example, the interlayer adhesive layer PIB may be formed by including polyisobutylene. The interlayer adhesive layer PIB may be disposed on the input sensing part TP and prevent or reduce the corrosion of the sensing electrodes of the input sensing part TP. The display device DD-b of one or more embodiments may include the optical adhesive layer AP-a and the adhesive member AP formed from the resin composition RC according to one or more embodiments, and the display device DD-b including the optical adhesive layer AP-a and the adhesive member AP may show excellent or suitable reliability.

Figure 12:
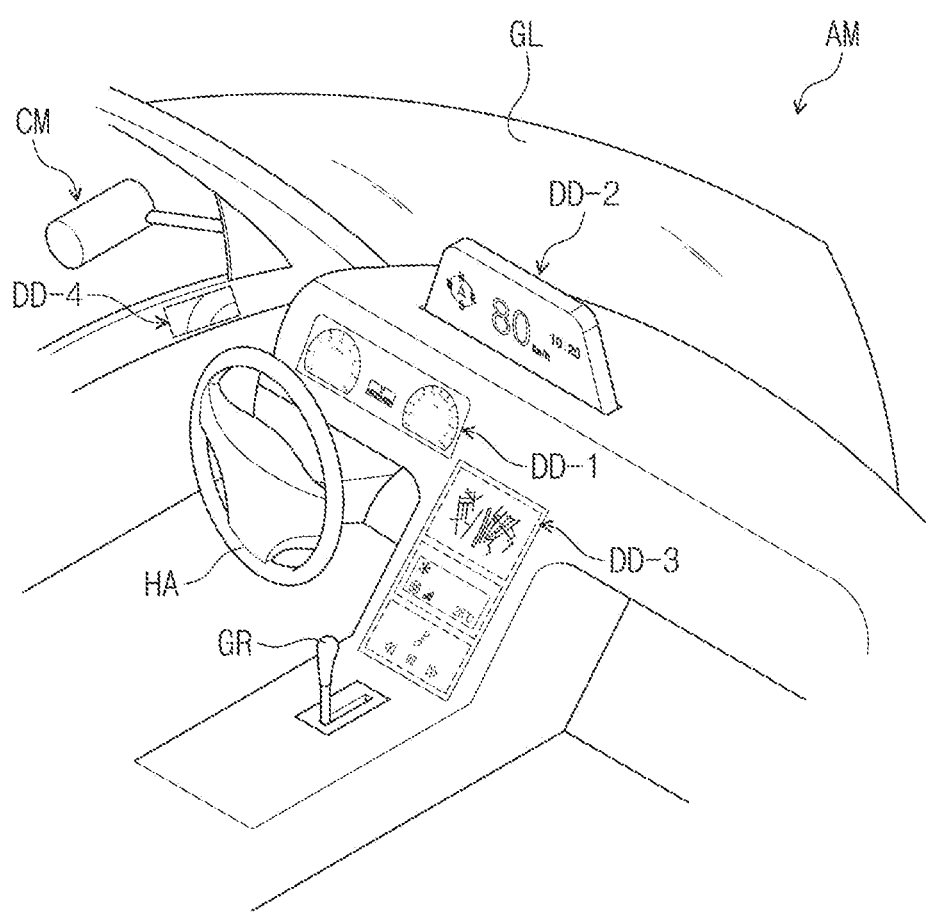
FIG. 12 is a diagram showing a vehicle in which a display device according to one or more embodiments of the present disclosure is disposed.

FIG. 12 is a diagram showing an automobile AM in which first to fourth display devices DD-1, DD-2, DD-3 and DD-4 are disposed. At least one of (among) the first to fourth display devices DD-1, DD-2, DD-3 and/or DD-4 may include the same configurations of the display devices DD, DD-a, and DD-b of embodiments, explained referring to FIGS. 1 to 3, 10 and 11.

In FIG. 12, a vehicle is shown as an automobile AM, but this is an illustration, and the first to fourth display devices DD-1, DD-2, DD-3 and DD-4 may be disposed on other transport means, such as bicycles, motorcycles, trains, ships and airplanes. In one or more embodiments, at least one of (among) the first to fourth display devices DD-1, DD-2, DD-3 and/or DD-4 including the same configuration of any one of (among) the display devices DD, DD-a, and/or DD-b may be introduced in other electronic devices as long as the configuration does not deviate from the one or more of the embodiments of the present disclosure.

At least one of (among) the first to fourth display devices DD-1, DD-2, DD-3 and/or DD-4 may include the adhesive member AP of one or more embodiments. The adhesive member AP of one or more embodiments has a glass transition temperature of about −10° C. or more and (to) less than about 10° C., and a loss tangent (tan δ) at a temperature of about −40° C. of less than about 0.3. In one or more embodiments, the adhesive member AP may have a 180° peel strength with respect to a glass substrate and a polymer substrate of about 2000 gf/25 mm or more. Accordingly, at least one of (among) the first to fourth display devices DD-1, DD-2, DD-3 and/or DD-4 may show excellent or suitable reliability.

Referring to FIG. 12, an automobile AM may include a steering wheel HA and a gear GR for the operation of the automobile AM, and a front window GL may be disposed to face a driver.

A first display device DD-1 may be disposed in a first region overlapping with the steering wheel HA. For example, the first display device DD-1 may be a digital cluster displaying the first information of the automobile AM. The first information may include a first graduation showing the running speed of the automobile AM, a second graduation showing the number of revolutions of an engine (i.e., revolutions per minute; RPM), and images showing a fuel state. The first graduation and the second graduation may be represented by digital images.

A second display device DD-2 may be disposed in a second region facing a driver's seat and overlapping with the front window GL. The driver's seat may be a seat where the steering wheel HA is disposed. For example, the second display device DD-2 may be a head up display (HUD) showing the second information of the automobile AM. The second display device DD-2 may be optically clear. The second information may include digital numbers showing the running speed of the automobile AM and may further include information including the current time. In one or more embodiments, the second information of the second display device DD-2 may be projected and displayed on the front window GL.

A third display device DD-3 may be disposed in a third region adjacent to the gear GR. For example, the third display device DD-3 may be a center information display (CID) for an automobile, disposed between a driver's seat and a passenger seat and showing third information. The passenger seat may be a seat separated from the driver's seat with the gear GR therebetween. The third information may include information on road conditions (for example, navigation information), on playing music or radio, on playing a dynamic image (or image), on the temperature in the automobile AM, and/or the like.

A fourth display device DD-4 may be disposed in a fourth region separated from the steering wheel HA and the gear GR and adjacent to the side of the automobile AM. For example, the fourth display device DD-4 may be a digital wing mirror displaying fourth information. The fourth display device DD-4 may display the external image of the automobile AM, taken by a camera module CM disposed at the outside of the automobile AM. The fourth information may include the external image of the automobile AM.

The above-described first to fourth information is for illustration, and the first to fourth display devices DD-1, DD-2, DD-3 and DD-4 may further display information on the inside and outside of the automobile. The first to fourth information may include different information from each other. However, the present disclosure is not limited thereto, and a portion of the first to fourth information may include the same information.

Hereinafter, referring to embodiments and comparative embodiments, the resin composition and adhesive member formed from the resin composition according to one or more embodiments of the present disclosure will be further explained. The embodiments below are illustrations to assist the understanding of the present disclosure, but the scope of the present disclosure is not limited thereto.

EXAMPLES

1. Preparation of Resin Composition, and Evaluation of Resin Composition and Adhesive Member

(1-1) Preparation of Resin Composition

The resin compositions of the Examples and Comparative Examples were prepared according to the mixing ratios described in Tables 1 and 2. The materials disclosed in Tables 1 and 2 in each weight ratio, were provided in a heat-resistant, light-shielding container. After that, stirring was performed at about 1000 rpm for about 30 minutes utilizing a planetary mixer (product of SHASHIN KAGAKU CO., LTD.) so that the composition was mixed uniformly to prepare each of the resin compositions of the Examples and Comparative Examples.

TABLE 1

| Material | | Molecular weight (Mw) | Example 1 | Example 2 | Example 3 | Example 4 | Example 5 |
|---|---|---|---|---|---|---|---|
| Oligomer | UV-3700B | 38,000 | 4 | 1 | | 4 | 4 |
| | UV-3300B | 13,000 | 4 | | 3 | 4 | 4 |
| | UN-7700 | 20,000 | | | 5 | | |
| Polyfunctional acryl monomer | Viscoat #260 | 268 | 0.2 | 1 | | | 1.8 |
| | Light acrylate TMP-A | 296 | | | 0.5 | | |
| | Light acrylate PE-4A | 352 | | | | 0.5 | |
| Monofunctional acryl monomer | IDAA | 212 | | 46 | 30 | 29.5 | 10 |
| | IBXA | 208 | 20 | 20 | 29.5 | 10 | 20 |
| | LA | 184 | 39.8 | | | 20 | 28.2 |
| | THF-A | 156 | 20 | 20 | 20 | 20 | 10 |
| | 4-HBA-LT | 144 | 10 | 10 | 10 | 10 | 20 |
| Photoinitiator | Omnirad 819 | 418 | 2 | 2 | 1 | 1 | 1 |
| | Omnirad 184 | 204 | | | 1 | 1 | 1 |

TABLE 2

| Material | | Molecular weight (Mw) | Comparative Example 1 | Comparative Example 2 | Comparative Example 3 | Comparative Example 4 | Comparative Example 5 | Comparative Example 6 |
|---|---|---|---|---|---|---|---|---|
| Oligomer | UV-3700B | 38,000 | 6 | 4 | 4 | 3 | 4 | 5.2 |
| | UV-3300B | 13,000 | 6 | 4 | 4 | 3 | 4 | |
| | UN-7700 | 20,000 | | | | | | |
| Polyfunctional acryl | Viscoat# 260 | 268 | 0.2 | 3 | | | | 0.4 |
| monomer | Light acrylate TMP-A | 296 | | | 0.5 | | | |
| | Light acrylate PE-4A | 352 | | | | 0.5 | | |
| Monofunctional acryl monomer | IDAA | 212 | | 27 | 49 | 24.5 | 10 | 49 |
| | IBXA | 208 | 20 | 20 | 10.5 | 35 | 20 | |
| | LA | 184 | 39.8 | | | | 30 | |
| | THF-A | 156 | 16 | 30 | 20 | 20 | 10 | |
| | 4-HBA-LT | 144 | 10 | 10 | 10 | 12 | 20 | 2.4 |
| | SYA004 | 228 | | | | | | 41 |
| Photoinitiator | Omnirad 819 | 418 | 2 | 2 | 1 | 1 | 1 | 1 |
| | Omnirad 184 | 204 | | | 1 | 1 | 1 | 1 |

In Tables 1 and 2, the oligomer corresponds to the above-described urethane (meth)acrylate oligomer, and the polyfunctional acryl monomer corresponds to the above-described polyfunctional (meth)acrylate monomer. The monofunctional acryl monomer corresponds to the above-described monofunctional (meth)acrylate monomer.

Data on the Materials in Tables 1 and 2

UV-3700B: urethane acrylate (product of Mitsubishi Chemical Inc.)
UV-3300B: urethane acrylate (product of Mitsubishi Chemical Inc.)
UN-7700: urethane acrylate (product of Negami Chemical Industrial Co., Ltd.)
Viscoat #260: 1,9-nonanediol dimethacrylate (product of Osaka Organic Chemical Industry)
Light acrylate TMP-A: trimethylolpropane trimethacrylate (product of Kyoeisha Chemical Co., Ltd.)
Light acrylate PE-4A: pentaerythritol triacrylate (product of Kyoeisha Chemical Co., Ltd.)
IDAA: iso-decyl acrylate (product of Osaka Organic Chemical Industry Ltd.)
IBXA: isobornyl acrylate (product of Osaka Organic Chemical Industry Ltd.)
LA: lauryl acrylate (product of Osaka Organic Chemical Industry Ltd.)
THF-A: tetrahydrofurfuryl acrylate (product of Kyoeisha Chemical Co., Ltd.)
4-HBA-LT: 4-hydroxybutyl acrylate (product of Osaka Organic Chemical Industry Ltd.)
SYA004: 10-hydroxydecyl methacrylate (product of Sanyu Chemical Research Institute Co., Ltd.)
Omnirad 819: phenylbis(2,4,6-trimethylbenzoyl)phosphine oxide (product of IGM Resins Co.)
Omnirad 184: 1-hydroxy cyclohexyl-phenylketone (product of IGM Resins Co.)

(1-2) Evaluation of Resin Composition and Adhesive Member

In Tables 3 and 4, the viscosity at a temperature of about 30° C. of each of the resin compositions of the Examples and Comparative Examples, the provision of inkjet printing or not, the glass transition temperature of the adhesive member, the loss tangent (tan δ) at a temperature of about –40° C., the rework reliability at a temperature of about –40° C., and the 180° peel strength at a temperature of about 25° C. were evaluated and shown. The provision of inkjet printing was evaluated by the availability of coating by an inkjet printer machine, and the rework reliability was evaluated on the detachability of a glass substrate from an adhesive membrane. Hereinafter, evaluation methods will be explained in more detail.

Measurement of Viscosity of Resin Composition

The viscosity of a resin composition at a temperature of about 30° C. was measured by a JISK 2283 method. The viscosity of the resin composition was measured under speed conditions of about 50 rpm utilizing a viscometer TVE-25L (product of TOKI SANGYO Co., Ltd.).

Provision of Inkjet Printing of Resin Composition

The resin composition prepared was applied to a thickness of about 200 μm on a soda-lime glass (product of Central Glass Co., Ltd.) utilizing an inkjet printer (product of MICROJET Co.). Ultraviolet was irradiated to the resin composition applied to cure, and the appearance of the cured product (i.e., adhesive member) after curing was observed. In Tables 3 and 4, a case where the resin composition was discharged stably and formed a substantially uniform thickness was designated by "⊚", and a case where the resin composition was not discharged from the inkjet printer was designated by "X".

Glass Transition Temperature and Loss Tangent (Tan δ) of Adhesive Member

On a slide glass (product of Matunami Glass Ind., Ltd., slide glass S1112), a release treated PET film (product of PANAC CO., LTD., NP100A), and a silicon rubber sheet with a hole of a diameter of about 8 mm (product of Tigers Polymer Corporation) were laminated in order. 28 μL of the resin composition was dropped into the hole of the silicon rubber, and ultraviolet was irradiated utilizing UV-LED lamps having peaks of about 405 nm and about 365 nm such that the total dosages of light were about 220 mJ/cm$^2$ and about 380 mJ/cm$^2$, respectively. Then, a release treated PET film (product of PANAC CO., LTD., NP100A) and a slide glass (product of Matunami Glass Ind., Ltd., slide glass S1112) were laminated in order. After irradiating ultraviolet, ultraviolet was irradiated from the upper portion of the slide glass utilizing a UV-LED lamp having a peak of about 395 nm such that the total dosage of the light was about 4000 mJ/cm$^2$ to obtain an adhesive member (a diameter of about 8 mm and a thickness of about 500 μm). The glass transition temperature and loss tangent (tan δ) of the adhesive member were measured utilizing a dynamic viscoelasticity measurement device (product of Anton Paar Japan, MCR302). Measurement conditions were a frequency of about 1 Hz, a temperature range of about –50° C. to about 80° C., and a temperature elevation rate of about 2° C./min.

Evaluation of Rework of Adhesive Member

The resin composition prepared was applied at the center area of a soda-lime glass (product of Central Glass Co., Ltd., 25 mm×75 mm×1.1 mm) to a diameter of about 20 mm and a thickness of about 200 μm. On the resin composition applied, ultraviolet was irradiated utilizing UV-LED lamps having peaks of about 405 nm and about 365 nm such that the total dosages of light were about 220 mJ/cm$^2$ and about 380 mJ/cm$^2$, respectively, to form a preliminary adhesive member. On the preliminary adhesive member, a soda-lime glass (product of Central Glass Co., Ltd., 25 mm×75 mm×1.1 mm) was provided. Two soda-line glasses provided before and after forming the preliminary adhesive member were attached and treated at a temperature of about 30° C. under pressure conditions of about 0.5 MPa for about 5 minutes utilizing an automatic heating and pressing equipment (product of Chiyoda Electric Co., Ltd., product name: ACS-230). Then, ultraviolet was irradiated to the preliminary adhesive member such that the total dosage of the light was about 4000 mJ/cm$^2$ to obtain an adhesive member. A laminate of the soda-lime glass, adhesive member, and soda-lime glass, laminated in order was installed in a tensile tester (product of INSTRON Co., INSTRON 5965 type or kind), as shown in FIG. 13.

Figure 13:
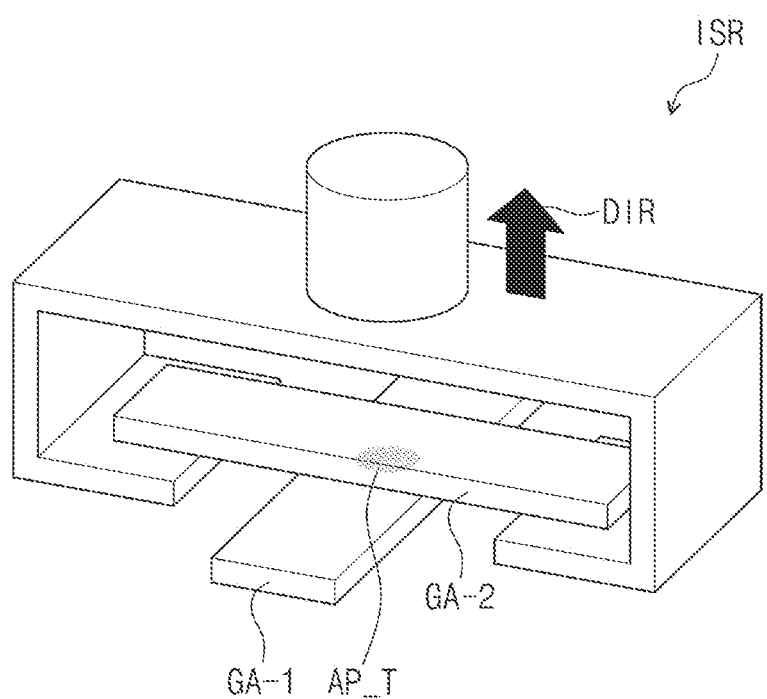
FIG. 13 is a diagram schematically showing a rework evaluation method in the Examples and Comparative Examples.

FIG. 13 is a diagram schematically showing a rework evaluation method. Referring to FIG. 13, a second glass substrate GA-2 is detached from a first glass substrate GA-1. The first glass substrate GA-1 and the second glass substrate GA-2 correspond to soda-lime glasses provided, and a tensile tester ISR corresponds to the product of INSTRON of INSTRON 5965 type or kind. An adhesive member AP_T provided between the first glass substrate GA-1 and the second glass substrate GA-2 corresponds to the adhesive member formed. For the detachment of the second glass substrate GA-2, a tensile tester ISR is provided, and a portion of the bottom surface of the second glass substrate GA-2, which does not make contact with the first glass substrate GA-1, is disposed on the tensile tester ISR. The first glass substrate GA-1 is fixed, the tensile tester ISR moves in a direction DIR away from the first glass substrate GA-1, and the second glass substrate GA-2 is detached from the first glass substrate GA-1.

Evaluation conditions were a temperature of about −40° C. and a tensile rate of about 10 mm/min. In Tables 3 and 4, a case where there was no damage on the soda-lime glass and no damage on the adhesive member was designated by "⊚". In Tables 3 and 4, "resin breakage" refers to a case where the adhesive member was broken, and the adhesive member remained on the detached soda-lime glass, and "glass breakage" refers to a case where the soda-lime glass was broken.

180° Peel Strength of Adhesive Member

The resin composition prepared was applied on a soda-lime glass (product of Central Glass Co., Ltd.) utilizing an inkjet printer (product of MICROJET Co.) to a thickness of about 200 μm. On the resin composition applied, ultraviolet was irradiated utilizing UV-LED lamps having peaks of about 405 nm and about 365 nm such that the total dosages of light were about 220 mJ/cm² and about 380 mJ/cm², respectively, to form a preliminary adhesive member. On the preliminary adhesive member, a PET film (product of TOYOBO Co., Ltd., product name of A4360) was attached and treated at a temperature of about 30° C. under pressure conditions of about 0.5 MPa for about 5 minutes utilizing an automatic heating and pressing equipment (product of Chiyoda Electric Co., Ltd., product name: ACS-230). Then, ultraviolet was irradiated to the preliminary adhesive member such that the total dosage of the light was about 4000 mJ/cm² to obtain a laminator including an adhesive member. The 180° peel strength of the laminate thus obtained was measured utilizing a tensile tester (product of INSTRON Co., INSTRON 5965 type or kind). The 180° peel strength was measured at a temperature of about 25° C. at a tensile rate of about 300 mm/min.

Referring to Table 3, it could be found that the resin compositions of Examples 1 to 5 showed viscosity measured at a temperature of about 30° C. by JISK 2283 of about 5 mPa·s or more and (to) less than about 20 mPa·s. It could be found that the provision of an inkjet printing method is easy for the resin compositions of Examples 1 to 5, having the viscosity of about 5 mPa·s or more and (to) less than about 20 mPa·s. The resin compositions of Examples 1 to 5 correspond to the resin composition according to one or more embodiments, and the adhesive members formed from the resin compositions of Examples 1 to 5 correspond to the adhesive member according to one or more embodiments.

It could be found that the adhesive members formed from the resin compositions of Examples 1 to 5 showed the glass transition temperature of about −10° C. or more and (to) less than about 10° C., and loss tangent (tan δ) at a temperature of about −40° C. of about 0.01 or more and (to) less than about 0.3. It could be found that the adhesive members formed from the resin compositions of Examples 1 to 5 showed no breakage of a glass substrate and adhesive member during rework at a temperature of about −40° C. It could be found that the adhesive members formed from the resin compositions of Examples 1 to 5 showed a 180° peel strength at a temperature of about 25° C. of about 2000 gf/25 mm or more.

The adhesive members formed from the resin compositions of Examples 1 to 5 satisfy the glass transition temperature and the loss tangent (tan δ) at a temperature of about −40° C. of the adhesive member according to one or more embodiments. Accordingly, the adhesive member satisfying the glass transition temperature and the loss tangent (tan δ) at a temperature of about −40° C. according to one or more embodiments may show excellent or suitable reliability during reworking at a temperature of about −40° C. The adhesive member of one or more embodiments has high peel strength at a temperature of about 25° C. and may show excellent or suitable adhesion reliability.

TABLE 3

|  | Example 1 | Example 2 | Example 3 | Example 4 | Example 5 |
| --- | --- | --- | --- | --- | --- |
| Viscosity of resin composition [mPa · s, 30° C.] | 10.8 | 5.2 | 19.7 | 8.2 | 11.6 |
| Inkjet printing provision of resin composition [30° C.] | ⊚ | ⊚ | ⊚ | ⊚ | ⊚ |
| Glass transition temperature of adhesive member [Tg, ° C.] | −8 | −2 | 9 | 1 | 4 |
| Loss tangent of adhesive member [tan δ, −40° C.] | 0.28 | 0.17 | 0.05 | 0.15 | 0.13 |
| Rework evaluation of adhesive member [−40° C.] | ⊚ | ⊚ | ⊚ | ⊚ | ⊚ |
| 180° peel strength of adhesive member [gf/25 mm, 25° C.] | 2140 | 2970 | 3650 | 2600 | 3100 |

TABLE 4

|  | Comparative Example 1 | Comparative Example 2 | Comparative Example 3 | Comparative Example 4 | Comparative Example 5 | Comparative Example 6 |
|---|---|---|---|---|---|---|
| Viscosity of resin composition [mPa·s, 30° C.] | 29.0 | 10.2 | 14.7 | 12.8 | 11.7 | 15 |
| Inkjet printing provision of resin composition [30° C.] | X | ⊚ | ⊚ | ⊚ | ⊚ | ⊚ |
| Glass transition temperature of adhesive member [Tg, ° C.] | −9 | 4 | −25 | 31 | 3 | −35 |
| Loss tangent of adhesive member [tan δ, −40° C.] | 0.26 | 0.08 | 0.55 | 0.12 | 0.23 | 1.7 |
| Rework evaluation of adhesive member [−40° C.] | ⊚ | ⊚ | Resin breakage | Glass breakage | Resin breakage | Resin breakage |
| 180° peel strength of adhesive member [gf/25 mm, 25° C.] | 2290 | 1240 | 1650 | 3200 | 1820 | 1200 |

Referring to Table 4, it could be found that the resin composition of Comparative Example 1 showed a viscosity measured at a temperature of about 30° C. by JISK 2283 of about 20 mPa·s or more. The resin composition of Comparative Example 1 includes about 10 wt % or more of an oligomer based on the total weight of the resin composition (Table 2), and the weight range of the urethane (meth) acrylate oligomer according to one or more embodiments was not satisfied. Accordingly, the resin composition of Comparative Example 1 showed a viscosity of about 20 mPa·s or more, and could not be discharged from an inkjet printer.

It could be found that the adhesive member formed from the resin composition of Comparative Example 2 showed a 180° peel strength at a temperature of about 25° C. of less than about 2000 gf/25 mm. The resin composition of Comparative Example 2 includes about 2 wt % or more of a monofunctional acryl monomer based on the total weight of the resin composition (Table 2), and the weight range of the monofunctional (meth)acrylate monomer according to one or more embodiments was not satisfied. The adhesive members formed from the resin composition of Comparative Example 2, including a relatively large weight of the polyfunctional acryl monomer showed degraded adhesion to the glass substrate. Accordingly, the adhesive member formed from the resin composition of Comparative Example 2 showed a relatively low 180° peel strength at a temperature of about 25° C.

The adhesive member formed from the resin composition of Comparative Example 3 showed a 180° peel strength at a temperature of about 25° C. of less than about 2000 gf/25 mm. The resin composition of Comparative Example 3 did not satisfy the 180° peel strength according to one or more embodiments. It could be found that the adhesive member formed from the resin composition of Comparative Example 3 showed a glass transition temperature of less than about −10° C., and a loss tangent (tan δ) at a temperature of about −40° C. of about 0.3 or more. The adhesive member formed from the resin composition of Comparative Example 3 did not satisfy the glass transition temperature and loss tangent according to one or more embodiments. Accordingly, breakage was found in the adhesive member formed from the resin composition of Comparative Example 3 during the rework at a temperature of about −40° C.

It could be found that the adhesive member formed from the resin composition of Comparative Example 4 showed a glass transition temperature of about 10° C. or more. The adhesive member having a glass transition temperature of about 10° C. or more shows solid properties at a temperature of about −40° C. Accordingly, breakage was found in the window detached from the adhesive member formed from the resin composition of Comparative Example 4 during the rework at a temperature of about −40° C.

The adhesive member formed from the resin composition of Comparative Example 5 showed a 180° peel strength at a temperature of about 25° C. of less than about 2000 gf/25 mm. The adhesive members formed from the resin composition of Comparative Example 5 did not satisfy the 180° peel strength according to one or more embodiments. The resin composition of Comparative Example 5 did not include a polyfunctional acryl monomer, i.e., a polyfunctional (meth)acrylate monomer, and the crosslinking density during forming the adhesive member was degraded. Accordingly, breakage was found in the adhesive member formed from the resin composition of Comparative Example 5 during the rework at a temperature of about −40° C.

The adhesive members formed from the resin composition of Comparative Example 6 showed a 180° peel strength at a temperature of about 25° C. of less than about 2000 gf/25 mm. The adhesive members formed from the resin composition of Comparative Example 6 did not satisfy the 180° peel strength according to one or more embodiments. It could be found that the adhesive member formed from the resin composition of Comparative Example 6 showed a glass transition temperature of less than about −10° C., and a loss tangent (tan δ) at a temperature of about −40° C. of about 0.3 or more. The adhesive member formed from the resin composition of Comparative Example 6 did not satisfy the glass transition temperature and loss tangent according to one or more embodiments. Accordingly, breakage was found in the adhesive member formed from the resin composition of Comparative Example 6 during the rework at a temperature of about −40° C.

2. Preparation of Resin Composition, and Evaluation of Resin Composition and Adhesive Member

(2-1) Preparation of Resin Composition

The resin compositions of the Examples and Comparative Examples were prepared according to the materials and weights described in Table 5. The resin composition of Example 1 is the same as the resin composition of Example 1 described in Table 1. The materials disclosed in Table 5 in each weight ratio were provided in a heat-resistant, light-shielding container. After that, stirring was performed at about 1000 rpm for about 30 minutes utilizing a planetary mixer (product of SHASHIN KAGAKU CO., LTD.) so that the compositions were mixed uniformly to prepare each of the resin compositions of the Examples and Comparative Examples.

weight of the resin composition, and in the resin composition of Comparative Example 8, the weight of the organic solvent was about 4.76 wt % based on the total weight of the resin composition. The resin compositions of Comparative Examples 7 and 8 include about 1 wt % or more of the organic solvent based on the total weight of the resin composition.

(2-2) Evaluation of Resin Composition and Adhesive Member

In Table 6, the viscosity at a temperature of about 30° C. of each of the resin compositions of the Examples and Comparative Examples, the provision of inkjet printing or not, the glass transition temperature of the adhesive members, the loss tangent (tan δ) at a temperature of about −40°

TABLE 5

| Material | | Molecular weight (Mw) | Example 1 | Example 6 | Comparative Example 7 | Comparative Example 8 |
|---|---|---|---|---|---|---|
| Oligomer | UV-3700B | 38,000 | 4 | 4 | 4 | 4 |
| | UV-3300B | 13,000 | 4 | 4 | 4 | 4 |
| Polyfunctional acryl monomer | Viscoat#260 | 268 | 0.2 | 0.2 | 0.2 | 0.2 |
| Monofunctional acryl monomer | IBXA | 208 | 20 | 20 | 20 | 20 |
| | LA | 184 | 39.8 | 39.8 | 39.8 | 39.8 |
| | THF-A | 156 | 20 | 20 | 20 | 20 |
| | 4-HBA-LT | 144 | 10 | 10 | 10 | 10 |
| Photoinitiator | Omnirad 819 | 418 | 2 | 2 | 2 | 2 |
| Organic solvent | MEK | 72 | | 1 | 2 | 5 |

In Table 5, MEK is methyl ethyl ketone and corresponds to the above-described organic solvent. In Table 5, the same contents as those explained referring to Tables 1 and 2 may be applied for the materials, except for MEK.

In the resin composition of Example 6, the weight of the organic solvent was about 0.99 wt % based on the total weight of the resin composition, and thus the resin composition contained less than about 1 wt % of an organic solvent. The resin composition of Example 6 is the resin composition according to one or more embodiments. In the resin composition of Comparative Example 7, the weight of the organic solvent was about 1.96 wt % based on the total C., the rework reliability at a temperature of about −40° C., and the 180° peel strength at a temperature of about 25° C. were evaluated and shown. The provision of inkjet printing was evaluated by the availability of coating by an inkjet printer machine, and the rework reliability was evaluated on the detachability of a glass substrate from an adhesive membrane. The evaluation results shown in Table 6 were evaluated by the same methods as the evaluation methods explained referring to Tables 3 and 4 and recorded.

TABLE 6

| | Example 1 | Example 6 | Comparative Example 7 | Comparative Example 8 |
|---|---|---|---|---|
| Viscosity of resin composition [mPa · s, 30° C.] | 10.8 | 10.2 | 9.7 | 8.4 |
| Inkjet printing provision of resin composition [30° C.] | ◎ | ◎ | ◎ | ◎ |
| Glass transition temperature of adhesive member [Tg, ° C.] | −8 | −8 | −10 | Poor curing |
| Loss tangent of adhesive member [tan δ, −40° C.] | 0.28 | 0.29 | 0.32 | Poor curing |
| Rework evaluation of adhesive member [−40° C.] | ◎ | ◎ | ◎ | Poor curing |
| 180° peel strength of adhesive member [gf/25 mm, 25° C.] | 2140 | 2080 | 1050 | Poor curing |

Referring to Table 6, it could be found that the resin composition of Example 6 showed a viscosity measured at a temperature of about 30° C. by JISK 2283 of about 5 mPa·s or more and (to) less than about 20 mPa·s. It could be found that the provision of an inkjet printing method is easy for the resin composition of Example 6, having the viscosity of about 5 mPa·s or more and (to) less than about 20 mPa·s. The resin composition of Example 6 corresponds to the resin composition according to one or more embodiments, and the adhesive member formed from the resin composition of Example 6 corresponds to the adhesive member according to one or more embodiments.

It could be found that the adhesive member formed from the resin composition of Example 6 showed a glass transition temperature of about −10° C. or more and (to) less than about 10° C., and a loss tangent (tan δ) at a temperature of about −40° C. of about 0.01 or more and (to) less than about 0.3. It could be found that the adhesive member formed from the resin composition of Example 6 showed no breakage of a glass substrate and adhesive member during rework at a temperature of about −40° C. It could be found that the adhesive member formed from the resin composition of Example 6 showed a 180° peel strength at a temperature of about 25° C. of about 2000 gf/25 mm or more.

The resin composition of Example 6 includes less than about 1 wt % of an organic solvent based on the total weight of the resin composition. It could be found that the resin composition of Example 6 and the adhesive member formed from the resin composition showed the same levels of physical properties and properties as the resin composition of Example 1 and the adhesive member formed from the resin composition.

It could be found that the adhesive member formed from the resin composition of Comparative Example 7 showed a 180° peel strength at a temperature of about 25° C. of less than about 2000 gf/25 mm. The resin composition of Comparative Example 7 includes about 1 wt % or more of an organic solvent based on the total weight of the resin composition, which is greater than the weight range of the organic solvent according to one or more embodiments. The resin composition of Comparative Example 7 includes a relatively large amount of the organic solvent and shows a low 180° peel strength after curing.

The resin composition of Comparative Example 8 showed poor curing, and did not be cured through the irradiation of ultraviolet. For example, the resin composition of Comparative Example 8 did not form an adhesive member through the irradiation of ultraviolet. The resin composition of Comparative Example 8 includes about 1 wt % or more of an organic solvent based on the total weight of the resin composition, which is greater than the weight range of the organic solvent according to one or more embodiments. The resin composition of Comparative Example 8 includes a relatively large amount of an organic solvent and did not cure.

The display device of one or more embodiments may include an adhesive member between a display panel and a window. The adhesive member of one or more embodiments may be formed from a resin composition including at least one urethane (meth)acrylate oligomer, at least one polyfunctional (meth)acrylate monomer, and at least one photoinitiator. The urethane (meth)acrylate oligomer may include two (meth)acryloyl groups per oligomer unit, and the polyfunctional (meth)acrylate monomer may include multiple (meth)acryloyl groups per monomer unit. The glass transition temperature of the adhesive member may be about −10° C. or more and (to) less than about 10° C., and the loss tangent (tan δ) at a temperature of about −40° C. of the adhesive member may be about 0.01 or more and (to) less than about 0.3. The 180° peel strength at a temperature of about 25° C. of the adhesive member may be about 2000 gf/25 mm or more. Accordingly, the adhesive member of one or more embodiments may show easy rework at a temperature of about −40° C. without damage of the adhesive member and the window attached to the adhesive member. The adhesive member of one or more embodiments may show excellent or suitable adhesion reliability.

The glass transition temperature and loss tangent of the adhesive member of one or more embodiments are optimized or substantially optimized, and easy rework properties at a low temperature may be shown.

A method of manufacturing a display device including forming the adhesive member of one or more embodiments includes a reworking step at a low temperature and may achieve improved manufacturing efficiency.

An adhesive member and a display device including the same may show relatively optimized or enhanced peel strength and may also show relatively excellent or improve adhesion reliability.

As used herein, the term "substantially," "about," and similar terms are used as terms of approximation and not as terms of degree, and are intended to account for the inherent deviations in measured or calculated values that would be recognized by those of ordinary skill in the art. "Substantially" as used herein, is inclusive of the stated value and means within an acceptable range of deviation for the particular value as determined by one of ordinary skill in the art, considering the measurement in question and the error associated with measurement of the particular quantity (i.e., the limitations of the measurement system). For example, "substantially" may mean within one or more standard deviations, or within ±30%, 20%, 10%, 5% of the stated value.

Also, any numerical range recited herein is intended to include all subranges of the same numerical precision subsumed within the recited range. For example, a range of "1.0 to 10.0" is intended to include all subranges between (and including) the recited minimum value of 1.0 and the recited maximum value of 10.0, that is, having a minimum value equal to or greater than 1.0 and a maximum value equal to or less than 10.0, such as, for example, 2.4 to 7.6. Any maximum numerical limitation recited herein is intended to include all lower numerical limitations subsumed therein and any minimum numerical limitation recited in this specification is intended to include all higher numerical limitations subsumed therein. Accordingly, Applicant reserves the right to amend this specification, including the claims, to expressly recite any sub-range subsumed within the ranges expressly recited herein.

Further, the use of "may" when describing embodiments of the present disclosure refers to "one or more embodiments of the present disclosure."

The light emitting device, electronic apparatus or any other relevant devices or components according to embodiments of the present disclosure described herein may be implemented utilizing any suitable hardware, firmware (e.g., an application-specific integrated circuit), software, or a combination of software, firmware, and hardware. For example, the various components of the device may be formed on one integrated circuit (IC) chip or on separate IC chips. Further, the various components of the device may be implemented on a flexible printed circuit film, a tape carrier package (TCP), a printed circuit board (PCB), or formed on one substrate. Further, the various components of the device may be a process or thread, running on one or more processors, in one or more computing devices, executing computer program instructions and interacting with other system components for performing the various functionalities described herein. The computer program instructions are stored in a memory which may be implemented in a computing device using a standard memory device, such as, for example, a random-access memory (RAM). The computer program instructions may also be stored in other non-transitory computer readable media such as, for example, a CD-ROM, flash drive, or the like. Also, a person of skill in the art should recognize that the functionality of various computing devices may be combined or integrated into a single computing device, or the functionality of a particular computing device may be distributed across one or more other computing devices without departing from the scope of the embodiments of the present disclosure.

Although the embodiments of the present disclosure have been described, it is understood that the present disclosure should not be limited to these embodiments, but one or more suitable changes and modifications can be made by one of ordinary skill in the art within the spirit and scope of the present disclosure as defined by the following claims and equivalents thereof.

What is claimed is:

1. A method of manufacturing a display device, the method comprising:
    applying a resin composition to a substrate;
    applying a first light to the resin composition to form a preliminary adhesive member;
    applying a glass substrate to the preliminary adhesive member;
    applying a second light to the preliminary adhesive member to form an adhesive member; and
    detaching the glass substrate at a temperature of about −40° C.,
    wherein the resin composition comprises:
        at least one urethane (meth)acrylate oligomer comprising two (meth)acryloyl groups per oligomer unit;
        at least one polyfunctional (meth)acrylate monomer comprising multiple (meth)acryloyl groups per monomer unit; and
        at least one photoinitiator.

2. The method of claim 1, wherein the resin composition further comprises at least one monofunctional (meth)acrylate monomer.

3. The method of claim 2, wherein a weight of the monofunctional (meth)acrylate monomer is about 85 wt % or more and about 97 wt % or less, based on a total weight of the resin composition.

4. The method of claim 1, further comprising, after detaching the glass substrate, applying the detached glass substrate to the adhesive member.

5. The method of claim 1, wherein the resin composition has a viscosity measured based on JISK 2283 at a temperature of about 30° C. of about 5 mPa·s or more and less than about 20 mPa·s.

6. The method of manufacturing a display device of claim 1, wherein the urethane (meth)acrylate oligomer has a weight-average molecular weight of about 10,000 or more and less than about 40,000.

7. The method of claim 1, wherein the polyfunctional (meth)acrylate monomer has a weight-average molecular weight of about 100 or more and less than about 400.

8. The method of claim 1, wherein the polyfunctional (meth)acrylate monomer comprises 2 to 4 (meth)acryloyl groups per monomer unit.

9. The method of claim 1, wherein the resin composition is applied by an inkjet printing method or a dispensing method.

10. The method of claim 1, wherein the method does not include drying the resin composition prior to applying the first light.

11. The method of claim 1, wherein the resin composition further comprises less than about 1 wt % of an organic solvent based on a total weight of the resin composition.

12. The method of claim 1, wherein a glass transition temperature of the adhesive member is about −10° C. or more and less than about 10° C., and a loss tangent (tan δ) of the adhesive member at a temperature of about −40° C. is about 0.01 or more and less than about 0.3.

13. The method of claim 1, wherein a total dosage of the second light is greater than a total dosage of the first light.

14. The method of claim 1, wherein the second light passes through the glass substrate and is provided to the preliminary adhesive member.

* * * * *